(12) United States Patent
Moriya et al.

(10) Patent No.: US 7,961,273 B2
(45) Date of Patent: Jun. 14, 2011

(54) OPTICAL MEMBER WITH RETARDATION CONTROL FUNCTION AND LIQUID CRYSTAL DISPLAY

(75) Inventors: Norihisa Moriya, Tokyo (JP); Shinji Hayashi, Saitama (JP); Yuji Nakatsugawa, Matsudo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 367 days.

(21) Appl. No.: 12/087,660

(22) PCT Filed: Jan. 25, 2008

(86) PCT No.: PCT/JP2008/051042
§ 371 (c)(1),
(2), (4) Date: Jul. 11, 2008

(87) PCT Pub. No.: WO2008/093598
PCT Pub. Date: Aug. 7, 2008

(65) Prior Publication Data
US 2010/0165256 A1    Jul. 1, 2010

(30) Foreign Application Priority Data
Feb. 2, 2007  (JP) ................... 2007-024614

(51) Int. Cl.
*G02F 1/1347* (2006.01)
*G02F 1/13* (2006.01)
*G02F 1/1339* (2006.01)

(52) U.S. Cl. .................... 349/75; 349/155; 349/193
(58) Field of Classification Search ............... 349/75, 349/76
See application file for complete search history.

(56) References Cited

U.S. PATENT DOCUMENTS

| | | | |
|---|---|---|---|
| 6,750,938 B2 | 6/2004 | Koyama | |
| 7,286,199 B2 | 10/2007 | Moriya | |
| 7,554,636 B2 * | 6/2009 | Nakatsugawa | ............... 349/118 |

FOREIGN PATENT DOCUMENTS

| | | | |
|---|---|---|---|
| GB | 2 324 382 A | | 10/1998 |
| JP | A 06-148654 | | 5/1994 |
| JP | A 10-319408 | | 12/1998 |
| JP | 11038424 A | * | 2/1999 |
| JP | A 11-038424 | | 2/1999 |
| JP | A 2000-221506 | | 8/2000 |
| JP | 2001125113 A | * | 5/2001 |
| JP | A 2001-125113 | | 5/2001 |
| JP | A 2003-057660 | | 2/2003 |
| JP | A 2004-524385 | | 8/2004 |
| JP | 2005003750 A | * | 1/2005 |
| JP | A 2005-003750 | | 1/2005 |
| WO | WO 02/44801 A2 | | 6/2002 |

* cited by examiner

*Primary Examiner* — Michelle R Connelly Cushwa
(74) *Attorney, Agent, or Firm* — Oliff & Berridge, PLC

(57) ABSTRACT

The invention provides a retardation-controlling optical member that includes a retardation layer obtained by aligning and fixing crosslinkable liquid crystal molecules and columnar structures disposed on the retardation layer. When a liquid crystal cell is formed by use of the retardation-controlling optical member, the columnar structures are effectively inhibited from subsiding in the retardation layer to locally make the cell gap smaller even when pressure is externally applied in a thickness direction of the liquid crystal cell. A sum total of lower bottom areas of columnar structures disposed on a retardation layer is made larger sufficiently compared to a total area of, in particular, an effective display region of a retardation layer surface where the columnar structures are disposed, whereby pressure applied from a thickness direction is dispersed.

27 Claims, 1 Drawing Sheet

OPTICAL MEMBER WITH RETARDATION CONTROL FUNCTION AND LIQUID CRYSTAL DISPLAY

BACKGROUND

1. Technical Field

The present invention relates to an optical member with a retardation control function and a liquid crystal display using the optical member, and in particular, to a liquid crystal display or an electroluminescence display excellent in the display quality and an optical member used therefor.

2. Background Art

In recent years, from high display characteristics, liquid crystal displays of In-Plane Switching mode and Multi-Domain Vertical Alignment mode are widely used. In order to expand a viewing field angle in the liquid crystal displays, a method where a film having the optical anisotropy is adhered to the outside of a liquid crystal cell has been widely used.

Recently, instead of the retardation film, a retardation layer that is formed in a cell with a liquid crystal material has been proposed. The retardation layer is called a so-called in-cell type. As a method of forming a retardation layer inside of a liquid crystal cell by use of a liquid crystal material such as a crosslinkable liquid crystal or a polymer liquid crystal, several methods have been proposed. For example, there has been proposed a method where an alignment film is formed in advance on a surface of a base material that forms the retardation layer by means of a rubbing method, an optical orientation method, an ion beam method or the like, followed by coating a liquid crystal composition containing a liquid crystal material on the alignment film in a base material thereof to form a retardation layer (for example, Patent document 1 below). Alternatively, corresponding to problems such as thinning of display devices and reduction of producing steps, a crosslinkable liquid crystal material composition for obtaining a retardation layer that realizes homeotropic alignment without using an alignment film is under study (for example, Patent document 2 below).

A substrate having the retardation layer is adhered to a counter substrate with a definite gap disposed therebetween and a driving liquid crystal material is filled into the gap portion to constitute a liquid crystal cell. At that time, in order to secure a definite gap between two substrates, a method where glass or transparent resin beads are sprayed is generally used (for example, Patent document 3). In the above method, the surface of the retardation layer and beads come into point contact. However, since the retardation layer is generally low in the hardness, there is a problem in that, when the retardation layer comes into point contact with the beads, the beads subside in the retardation layer, thereby making it difficult to secure a definite cell gap.

In view of the above problems, a technology of a method where columnar structures are disposed on a retardation layer to realize a highly precise cell gap is disclosed (for example, Patent document 4 below). In the columnar structure, a contact portion with a retardation layer becomes a surface. Accordingly, the columnar structure is inhibited from subsiding in a retardation layer, whereby a highly-controlled cell gap control is readily applied all over an entire effective display area.

Here, in many liquid crystal displays of a normally black mode, in general, a liquid crystal cell per se is designed so as to obtain the retardation of $\lambda/2$ that is a design wavelength at the time of white display when a voltage is applied. The retardation of the liquid crystal cell is expressed by $\Delta n$ (birefringence anisotropy)$\times d$ (thickness). That is, in order to enable to display uniformly over an entire screen, a thickness of a liquid crystal layer, that is, a cell gap has to be maintained highly precisely. In general, when the cell gap varies (decreases) by substantially 15% partially in a display area, the transmittance is deteriorated by substantially 4% to result in a visually observable level as the brightness unevenness.

Patent document 1: Japanese Patent Application Laid-Open No. 10-319408
Patent document 2: Japanese Patent Application National Publication No. 2004-524385
Patent document 3: Japanese Patent Application Laid-Open No. 06-148654
Patent document 4: Japanese Patent Application Laid-Open No. 2005-3750

SUMMARY

By the way, recently, a demand for thinning of a display is very high. In the liquid crystal display as well, in some cases, a panel may be finished by setting to a display body as it is in which a liquid crystal cell adheres to an optical film such as a polarization plate. According to such an aspect, a display surface is constituted with a liquid crystal panel exposed to an observer side. External pressure when, for example, an observer directly comes into contact with a display surface is directly applied to the liquid crystal panel.

At this time, when the stiffness in a thickness direction of a liquid crystal cell in a liquid crystal panel is deficient, there is a problem in that, in a portion where the pressure is externally applied, a cell gap of the liquid crystal cell may not be maintained. In general, the hardness of a retardation layer is smaller than that of a columnar structure. Thus, even in a liquid crystal cell where a columnar structure is directly disposed on the retardation layer, the columnar structure subsides in the retardation layer in some cases depending on the magnitude of the external pressure. In such a case, there is fear in that the cell gap is deformed by 15% or more to generate visually observable brightness unevenness on a display screen of a display.

The invention relates to a retardation-controlling optical member that includes a retardation layer obtained by aligning and fixing crosslinkable liquid crystal molecules and a columnar structure disposed on the retardation layer. The invention intends to provide an optical member that, when a liquid crystal cell is formed by use of the invention, is able to effectively inhibit the columnar structure from subsiding in the retardation layer to make the cell gap locally smaller even when pressure is externally applied in a thickness direction of the liquid crystal cell.

The invention is fundamentally characterized in that a sum total of lower surface areas of columnar structures disposed on a retardation layer is made sufficiently larger compared to a total area of an effective display region in a retardation layer surface on which the columnar structures are disposed, whereby pressure applied from a thickness direction is dispersed.

That is, the invention includes:

(1) A retardation-controlling optical member including: a substrate; a retardation layer formed directly or indirectly on the substrate by polymerizing crosslinkable liquid crystal molecules with orientation imparted thereto and including an effective display region; and a plurality of cell gap-controlling columnar structures formed on the retardation layer, wherein, among the plurality of cell gap-controlling columnar structures in contact with the retardation layer, a sum total of lower surface areas of the cell gap-controlling columnar structures disposed particularly in the effective display region is 0.3% or more of an area of the effective display region;

(2) The retardation-controlling optical member described in (1) above, wherein the columnar structure is formed with taper and, of upper and lower surfaces of the tapered columnar structure, a surface larger in area is taken as the lower surface that comes into contact with the retardation layer;

(3) The retardation-controlling optical member described in (2) above, wherein, when a surface where the tapered columnar structures come into contact with the retardation layer is taken as the lower surface of the columnar structures and, when a height of the columnar structure measured from the lower surface to the upper surface is set at 100%, a sectional area of the columnar structure cut at a height of 90% from the lower surface is 3% or more and 30% or less of the area of the lower surface;

(4) The retardation-controlling optical member described in (1) above, wherein at least two colors of different transparent colored regions are formed between the substrate and the retardation layer;

(5) The retardation-controlling optical member described in (2) above, wherein at least two colors of different transparent colored regions are formed between the substrate and the retardation layer;

(6) The retardation-controlling optical member described in (3) above, wherein at least two colors of different transparent colored regions are formed between the substrate and the retardation layer;

(7) The retardation-controlling optical member described in (4) above, wherein a light shielding region that partitions the transparent colored region is disposed between the substrate and the retardation layer, and the columnar structure is formed above the light shielding region;

(8) The retardation-controlling optical member described in (5) above, wherein a light shielding region that partitions the transparent colored region is disposed between the substrate and the retardation layer, and the columnar structure is formed above the light shielding region;

(9) The retardation-controlling optical member described in (6) above, wherein a light shielding region that partitions the transparent colored region is disposed between the substrate and the retardation layer, and the columnar structure is formed above the light shielding region;

(10) The retardation-controlling optical member described in (1) above, wherein the retardation layer is patterned for each pixel;

(11) The retardation-controlling optical member described in (2) above, wherein the retardation layer is patterned for each pixel;

(12) The retardation-controlling optical member described in (3) above, wherein the retardation layer is patterned for each pixel;

(13) The retardation-controlling optical member described in (4) above, wherein the retardation layer is patterned for each pixel;

(14) The retardation-controlling optical member described in (7) above, wherein the retardation layer is patterned for each pixel;

(15) A liquid crystal display comprising the retardation-controlling optical member described in (1) above;

(16) A liquid crystal display comprising the retardation-controlling optical member described in (2) above;

(17) A liquid crystal display comprising the retardation-controlling optical member described in (3) above;

(18) A liquid crystal display comprising the retardation-controlling optical member described in (4) above;

(19) A liquid crystal display comprising the retardation-controlling optical member described in (7) above; and

(20) A liquid crystal display comprising the retardation-controlling optical member described in (9) above.

(21) The retardation-controlling optical member described in (1) above, wherein the sum total of lower surface areas of the cell gap-controlling columnar structures disposed particularly in an effective display region is 7% or less of the area of the effective display region;

(22) The retardation-controlling optical member described in (1) above, wherein a constituent components of the columnar structure is in the range of the 2H to 5H by pencil hardness;

(23) The retardation-controlling optical member described in (1) above, wherein the sum total of lower surface areas of the cell gap-controlling columnar structures disposed particularly in an effective display region is 7% or less of an area of the effective display region, and a constituent components of the columnar structure is in the range of the 2H to 5H by pencil hardness;

(24) The retardation-controlling optical member described in (1) above, wherein the columnar structure is a cylindrical columnar so that an area of an upper surface is equal to an area of a lower surface or is taper so that an area of an upper surface is smaller than an area of a lower surface;

(25) The retardation-controlling optical member described in (1) above, wherein the columnar structure is prevented from subsiding in the retardation layer even when external pressure is applied in a thickness direction;

(26) The retardation-controlling optical member described in (1) above, wherein the columnar structure operates to disperse a load transmitted between the lower surface of the columnar structure and the retardation layer surface even when a user applies external pressure in a thickness direction;

(27) The retardation-controlling optical member described in (1) above, wherein the columnar structure brings an operation that a visually observable brightness unevenness due to a variation of a thickness direction is preferably inhibited from occurring.

The "retardation layer" in the invention means a layer having a retardation control function that is able to optically compensate a retardation variation of light.

The "lower surface" of a columnar structure means a portion of the columnar structure that comes into contact with a retardation layer that is a base material. Furthermore, the "upper surface" of a columnar structure means a portion of the columnar structure that comes into contact with a substrate that faces a retardation layer.

Furthermore, the "effective display region" in the invention means a region where transmission light is input/output to execute a predetermined display or observation. For example, when the invention is applied as an optical member in a liquid crystal panel, the effective display region means a region corresponding to an image display region in the liquid crystal panel. It is optional whether to form a columnar structure or not on a retardation layer surface and above or below the light shielding region in a plan view. However, when a substantially frame-like light shielding region is disposed at an outer periphery portion of the effective display region, the light shielding region is omitted from an effective display region in the invention. Accordingly, even when the columnar structure is disposed in the substantially frame-like light shielding region, a lower surface area of the columnar structure is omitted from a sum total of lower surface areas in the invention.

EFFECT OF THE INVENTION

According to the invention, a sum total of lower surface areas of columnar structures disposed in an effective display region on a retardation layer is 0.3% or more of the surface area of the effective display region. With this configuration, even when external pressure is applied in a thickness direction of a liquid crystal cell that is formed by use of the invention, the columnar structure is effectively inhibited from subsiding in the retardation layer. As a result, a thickness of a cell gap is inhibited from locally varying, whereby the visually observable brightness unevenness due to a variation of a thickness of a liquid crystal cell, which has been problematic, is preferably inhibited from occurring. Accordingly, when the invention is applied, high quality image display is obtained even when a liquid crystal panel obtained by only laminating a polarization plate and so on to a liquid crystal cell is used as a display of a mode where a liquid crystal panel is exposed to an observer side.

In particular, according to the invention of claim 2 where the columnar structure is formed tapered, a sum total of areas of upper surfaces of the columnar structures may be designed smaller than a sum total of areas of lower surfaces of the columnar structures in contact with a retardation layer that is a base material surface. Thereby, in comparison with a columnar structure having substantially the same sectional area in a height direction of the columnar structure or the like, a sum total of volumes of the columnar structures may be suppressed low with respect to an increase in a sum total of the areas of the lower surfaces of the columnar structures. Accordingly, when a liquid crystal cell is formed with a retardation-controlling optical member of the invention, a sum total amount of volumes that the columnar structures occupy in a space secured by the columnar structures is suppressed smaller. As a result, a driving liquid crystal material that is filled in the space is filled smoothly, so that the productivity of liquid crystal cells is improved.

Furthermore, the invention where a columnar structure is formed tapered has advantages as described below in a liquid crystal cell where, after columnar structures are formed on an upper surface of the retardation layer, an alignment film for promoting the orientation of a driving liquid crystal material is scheduled to be formed on an upper surface of the retardation layer including the columnar structures. That is, in a tapered columnar structure, an alignment control surface continuing from the retardation layer surface to the columnar structure side surface is gradual in comparison with a columnar structure having substantially the same cross-section in a height direction such as a cylinder. As a consequence, a driving liquid crystal material may be desirably aligned in a desired direction even in the proximity of the columnar structure, so that the driving liquid crystal material in the proximity of the columnar structure is inhibited from causing disturbance of the alignment. Accordingly, a discrimination line that causes the light leakage and is caused by the alignment defect is inhibited from occurring.

Furthermore, when the columnar structure of the invention is formed tapered, with a sum total of areas of lower surfaces of columnar structures increasing, a sum total of areas of upper surfaces is designed smaller than the sum total of the areas of the lower surfaces. That is, a buffering region may be disposed not in the proximity of the lower surface of the columnar structure, but in the proximity of the upper surface having a smaller sectional area, so that the hardness in the proximity of the upper surface can be designed intentionally smaller. As a result, when the invention provided with tapered columnar structures and a counter substrate are combined to form a liquid crystal cell, an adhesion margin when both substrates are assembled in a cell may be obtained in the proximity of the upper surface of the columnar structure that is designed smaller in the hardness. Accordingly, the adhesion margin is preferably secured.

DETAILED DESCRIPTION OF THE INVENTION

With reference to the drawings, the best mode for carrying out a retardation-controlling optical member of the invention will be described below. The columnar structure of this invention has the lower surface, that is, a lower bottom surface (a lower bottom), and the upper surface, that is, an upper bottom surface (an upper bottom).

Figure 1:
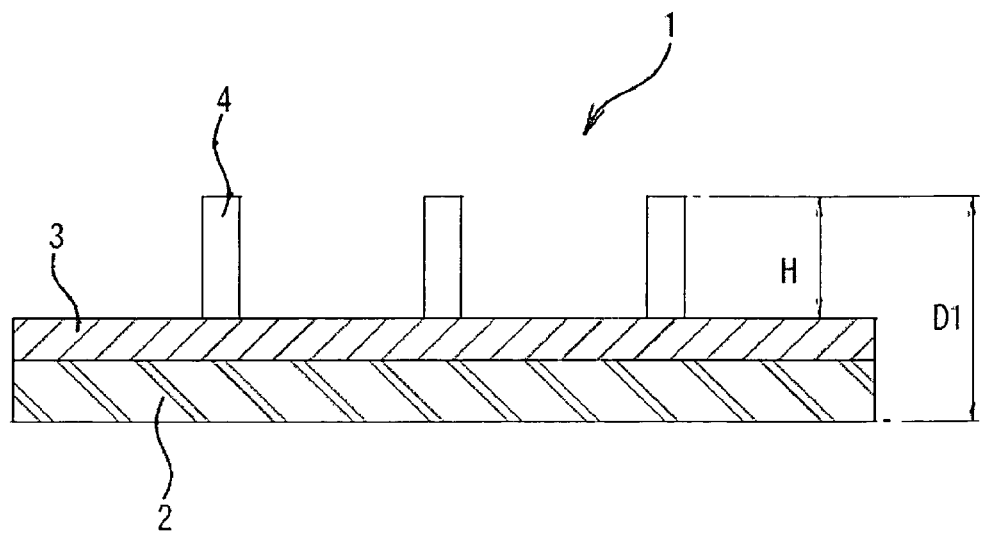
FIG. 1 is a schematic cross sectional view for describing an embodiment of a retardation-controlling optical member of the invention.
Figure 2:
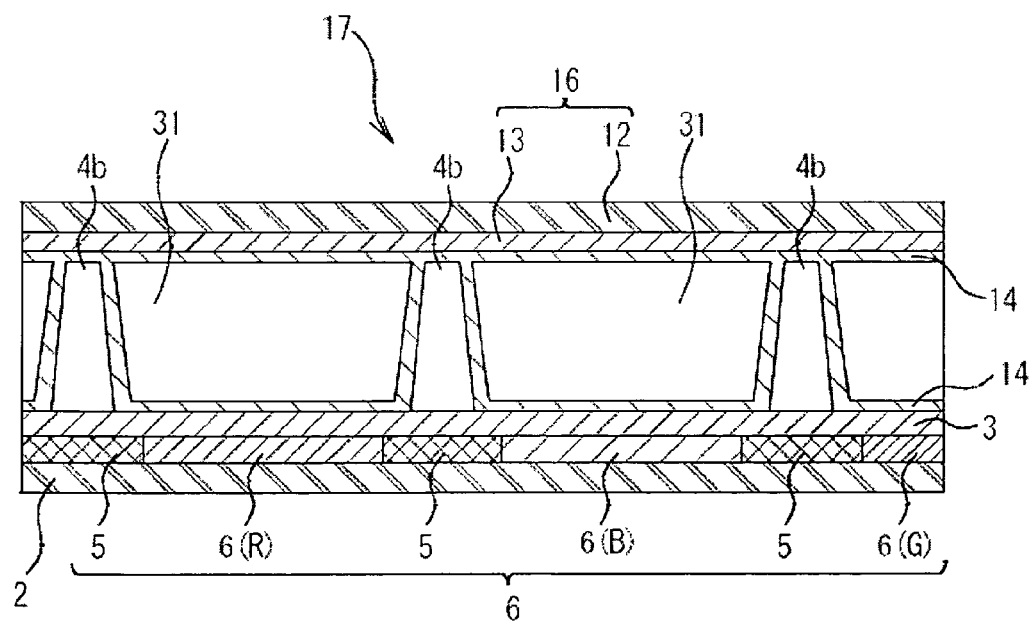
FIG. 2 is a schematic cross sectional view showing a liquid crystal display device that uses the retardation-controlling optical member of the invention.

FIG. 1 is one example showing a retardation-controlling optical member of the invention. A retardation-controlling optical member 1 is constituted such that a retardation layer 3 constituted of crosslinkable liquid crystal molecules is formed on an upper surface of a substrate 2, and further a plurality of cylindrical columnar structures 4 are formed on an upper surface of the retardation layer 3. As mentioned above, the retardation layer in the invention may be formed uniformly on a base material surface like the retardation layer 3 in FIG. 1. However, the invention is not restricted thereto. For example, as shown in FIG. 2 described below, when a retardation layer is formed on a colored layer 6 made of a light shielding region 5 and transparent colored regions 6(R), 6(G) and 6(B), the retardation layer may be formed by patterning to patterns of the respective colors of the transparent colored regions. Alternatively, even when a retardation layer is formed on a colored layer made of only transparent colored regions, the retardation layer may be patterned to patterns of the respective colors of the transparent colored regions (not shown in the drawing). The description does not omit to form a retardation layer uniformly on transparent colored regions. In an aspect where a retardation layer is patterned responding to the respective colors of the transparent colored regions, that is, for each colored pixel, a retardation amount determined in accordance with a wavelength of light of a color to be retardation controlled for each pixel is preferably imparted in accordance with the respective pixels.

(Substrate)

A substrate 2 is made of a light-transmitting substrate-forming material and may be formed in a single layer from one substrate-forming material or in a multi-layer from plural kinds of substrate-forming materials. The substrate 2 may be provided partially with a light shielding region or the like. The light transmittance of the substrate 2 may be appropriately selected.

The substrate-forming material is preferably constituted so as to have the optical isotropy. Other than glass materials such as glass substrates, planar bodies made of various kinds of materials may be appropriately selected as the substrate-forming material. In particular, when a retardation control member is used for liquid crystal displays, a substrate-forming material is preferred to be alkali-free glass. The substrate 2, depending on applications, is used in a thickness substantially in the range of 5 μm to 3 mm.

(Retardation Layer)

The retardation layer 3 is made of a liquid crystal material fixed with an aligned state maintained, and is a layer for controlling the retardation of light transmitted to a display. Such a control is realized when a crosslinkable liquid crystal material constituting the retardation layer 3 is oriented in a desired direction and polymerized to fix the oriented state.

Several aspects of retardation layers that may be formed by designing an alignment direction of crosslinkable liquid crystal molecules that constitute the retardation layer 3 in a desired direction will be cited below. In the beginning, a so-called positive C plate is cited in which crosslinkable liquid crystal molecules are vertically aligned (homeotropic alignment) and fixed, whereby an optical axis of the liquid crystal molecules is directed in a normal line direction of a retardation layer and a refractive index of extraordinary ray larger than that of ordinary ray is possessed in the normal line direction of the retardation layer. Furthermore, in another aspect, the retardation layer 3 may be a so-called positive A plate in which an optical axis of crosslinkable liquid crystal molecules is in parallel with a retardation layer and a refractive index of extraordinary ray larger than that of ordinary ray is possessed in an in-plane direction of the retardation layer. Still furthermore, a retardation layer 3 may be a so-called negative C plate where an optical axis of crosslinkable liquid crystal molecules is in parallel with a retardation layer and a spiral structure is taken in a normal line direction to take cholesteric orientation, whereby a refractive index of extraordinary ray smaller than that of ordinary ray is possessed in a normal line direction of the retardation layer as a whole. Furthermore, the retardation layer 3 may be a negative A plate where discotic liquid crystal having negative birefringence anisotropy has an optical axis thereof in an in-plane direction of the retardation layer. Still furthermore, the retardation layer 3 may be a hybrid orientation plate where an optical axis is oblique to the layer or the angle varies in a direction vertical to the layer.

The retardation layer 3 may be a layer made of any one of the positive C plate, negative C plate, positive A plate and hybrid orientation plate or a layer obtained by laminating these in combination. For example, a positive A plate and a positive C plate may be sequentially laminated on an upper surface of the substrate 2 to constitute a retardation layer 3. Alternatively, such a configuration is available that, first, a positive A plate is formed on an upper surface of the substrate 2, a colored layer made of a transparent colored region and a light shielding region described below is then formed thereon, and further a positive C plate is formed on an upper surface of the colored layer.

When a positive C plate is formed as the retardation layer 3, the retardation layer is formed by disposing a known vertical alignment film on a coated surface of a liquid crystal composition to vertically align crosslinkable liquid crystal molecules in the liquid crystal composition. Furthermore, in order to more stabilize and secure a vertically aligned state of the crosslinkable liquid crystal molecules, a vertical alignment aid may be further added to the liquid crystal composition in combination with the vertical alignment film or singularly.

The vertical alignment aid exerts an advantage of more stabilizing and securing an aligned state of the liquid crystal molecules when the crosslinkable liquid crystal molecules are homeotropically aligned. Specific examples of the vertical alignment aids include surface coupling agents having a vertically aligned alkyl chain or fluorocarbon chain such as lecithin or a quaternary ammonium surfactant such as HTAB (hexadecyl-trimethyl ammonium bromide), DMOAP (N,N-dimethyl-N-octadecyl-3-aminopropyltrimethoxysilyl chloride) or N-perfluorooctylsulfonyl-3-aminopropyltrimethyl ammonium iodide, a silane polymer, and long-chain alkyl alcohol.

Furthermore, in the case where a positive A plate is formed as the retardation layer 3, a rubbed horizontal alignment film is used to promote the orientation of crosslinkable liquid crystal molecules and a leveling agent for suppressing surface free energy of the crosslinkable liquid crystal molecules to an air interface is added to a retardation layer-forming liquid crystal composition, whereby the crosslinkable liquid crystal molecules may be horizontally aligned.

Still furthermore, a negative C plate may be formed as the retardation layer 3 in such a manner that a chiral agent is added to crosslinkable liquid crystal molecules contained in the liquid crystal composition to form chiral nematic liquid crystal, thereby to develop the cholesteric regularity. Specifically, the negative C plate may be formed by adding a chiral agent to a liquid crystal composition and by coating, similarly to the positive A plate, the liquid crystal composition on a horizontal alignment film. The chiral agent used in the invention does not necessarily have the crosslinkability in particular, and is not particularly restricted as far as it does not damage the liquid crystallinity of the crosslinkable liquid crystal molecules and is able to induce a desired spiral pitch.

However, when the thermal stability and so on of the retardation layer obtained are taken into consideration, preferably used is a chiral agent having the crosslinkability, capable of fixing a state where the chiral agent is polymerized with crosslinkable liquid crystal molecules contained in the retardation layer-forming liquid crystal composition and thereby the cholesteric regularity is imparted to the crosslinkable liquid crystal molecules. As such a chiral agent, in particular, one that has crosslinking functional groups at both terminals of its molecular structure is preferred from the viewpoint of improving the heat resistance of the retardation layer.

As a specific polymerizing chiral agent, a low molecular weight compound that has an optically active site in a molecule and a molecular weight of 1500 or less is preferred. Furthermore, a compound that is compatible with liquid crystal molecules exemplified in the specification in a solution state or in a molten state and may induce a spiral pitch without damaging the liquid crystallinity of molecules of crosslinking nematic liquid crystal is preferred.

When the retardation layer 3 is formed, first, a liquid crystal composition containing crosslinkable liquid crystal molecules is coated on a substrate to form a liquid crystal coating film. Available method of coating the liquid crystal composition include, for example, various kinds of printing methods such as a gravure printing method, an offset printing method, a relief printing method, a screen printing method, a transferring printing method, an electrostatic printing method and a plate-less printing method, coating methods such as a gravure coating method, a roll coating method, a knife coating method, an air-knife coating method, a bar coating method, a dip coating method, a kiss coating method, a spray coating method, a die coating method, a comma coating method, an inkjet coating method, a spin coat method and a slit coating method, or combinations thereof.

Next, the liquid crystal coating film is dried under reduced pressure to remove a solvent component, and the crosslinkable liquid crystal molecules contained in the liquid crystal coating film are aligned in a desired direction, followed by irradiating UV-ray or an electron beam or by applying heat illumination to polymerize the crosslinkable liquid crystal molecules aligned in the desired direction, whereby a retardation layer is formed. However, the method of forming the retardation layer in the invention is not restricted thereto, and any one of known methods may be adopted as far as it enables crosslinkable liquid crystal molecules to be polymerized and fixed on a substrate surface in a state of being aligned in a desired direction.

For example, when the retardation layer 3 having a function as a positive C plate is formed from the liquid crystal coating film, crosslinkable liquid crystal molecules in the liquid crystal coating film are homeotropically aligned to polymerize the crosslinkable liquid crystal molecules each other. In order to impart the homeotropic alignment to the crosslinkable liquid crystal molecules, the liquid crystal coating film is heated by use of IR-ray or the like. At that time, the homeotropic alignment is realized when a temperature of the liquid crystal coating film is set at a temperature where the crosslinkable liquid crystal molecules contained in the liquid crystal coating film exhibit a liquid crystal phase (liquid crystal phase temperature) or more and less than a temperature where the liquid crystal molecules exhibit an isotropic phase (liquid phase).

Furthermore, in order to polymerize (crosslinking polymerization) crosslinkable liquid crystal molecules imparted with the alignment each other in the liquid crystal coating film, light having a photosensitive wavelength of a photopolymerization initiator contained in the liquid crystal composition is illuminated on the surface of the liquid crystal coating film to be able to progress the polymerization. At that time, a wavelength of light illuminated on the liquid crystal coating film is appropriately selected in accordance with an absorption wavelength of the liquid crystal composition, and generally substantially in the range of 200 to 500 nm. The light illuminated on the liquid crystal coating film is not restricted to monochromatic light and may be light having a specified wavelength range including the photosensitive wavelength of the photopolymerization initiator. The retardation layer 3 may be formed from the liquid crystal coating film in such a manner that light is illuminated on the liquid crystal coating film to progress a crosslinking polymerization reaction of the crosslinkable liquid crystal molecules, and the liquid crystal coating film is further baked by use of an oven or the like. Applying such a baking enables to promote a polymerization reaction of the crosslinkable liquid crystal molecules contained in the retardation layer 3.

Thus, the crosslinkable liquid crystal molecules contained in the liquid crystal coating film are polymerized, resulting in formation of a retardation layer 3 where the crosslinkable liquid crystal molecules are fixed in a state of being aligned in a desired direction.

(Crosslinkable Liquid Crystal Molecule)

A nematic liquid crystal material having a bar structure may be used as a liquid crystal material having positive birefringence anisotropy for forming the retardation layer 3. Furthermore, as a liquid crystal material having the negative birefringence anisotropy, a discotic liquid crystal material having a disc structure may be used. The liquid crystal materials include a liquid crystal monomer, a liquid crystal oligomer and a liquid crystal polymer. In the invention, for the sake of conveniences, the liquid crystal materials are, in some cases, generically called liquid crystal molecules.

From the viewpoint of being able to cure with an aligned state of the liquid crystal molecules maintained, polymerizable liquid crystal molecules, in particular, crosslinkable liquid crystal monomer, which is/are polymerized and cured by illuminating ionizing radiation such as UV-ray and an electron beam, is/are preferably used. Since an amount of retardation and the orientation characteristics are determined based on a birefringence $\Delta n$ of the liquid crystal molecule and a thickness of the retardation layer, $\Delta n$ is preferably substantially in the range of 0.03 to 0.15.

As the crosslinkable liquid crystal monomer contained in the liquid crystal composition used when the retardation layer is formed, ones disclosed in, for example, Japanese Patent Application National Publication No. 10-508882 may be used. Furthermore, as the polymerizing chiral agent, ones disclosed in, for example, Japanese Patent Application Laid-Open (JP-A) No. 07-258638 may be used. More specific examples of the polymerizing nematic liquid crystal molecules include monomers, oligomers and polymers that have in a molecule at least one polymerizable group such as a (meth)acryloyl group, an epoxy group, an oxetane group, and an isocyanate group. Furthermore, more specific examples of the crosslinkable liquid crystal molecules include one kind of compounds expressed by formula (1) shown in [Chem 1] below (compound (I)), one kind of compounds expressed in formula (2) shown in [Chem 2] below (compound (II)) or a mixture of at least two kinds thereof, one kind of compound or a mixture of two kinds or more of compounds shown in [Chem 3] and [Chem 4] below (compound (III)), or a mixture obtained by combining these.

[Chem 1]

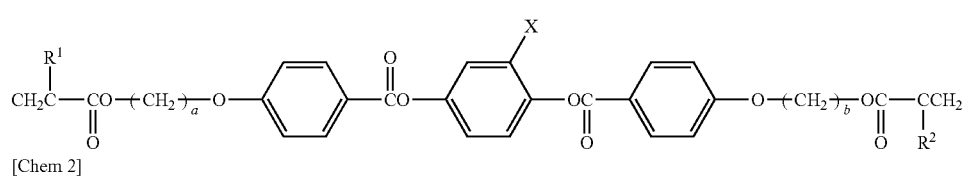

(1)

[Chem 2]

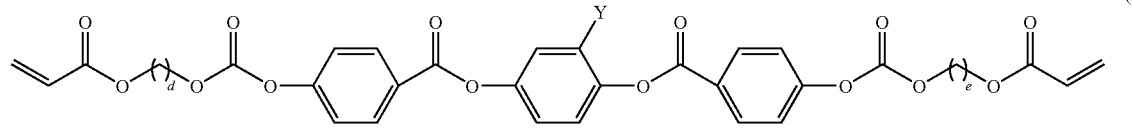

(2)

[Chem 3]

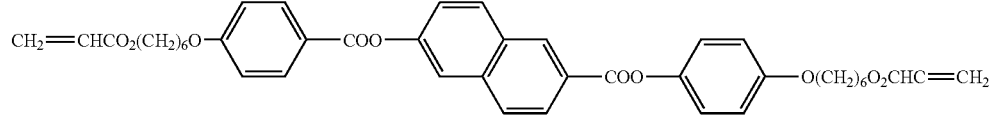

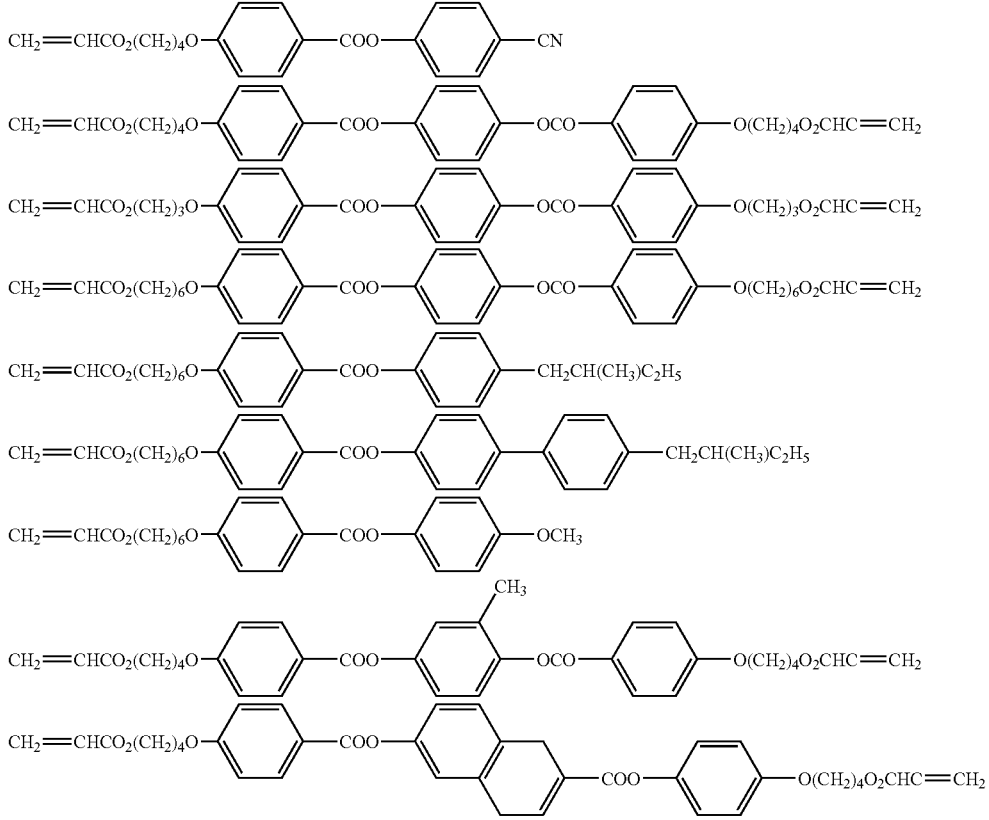

[Chem 4]

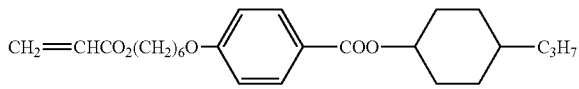
(a)

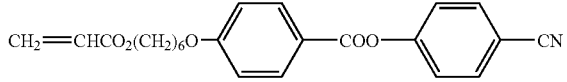
(b)

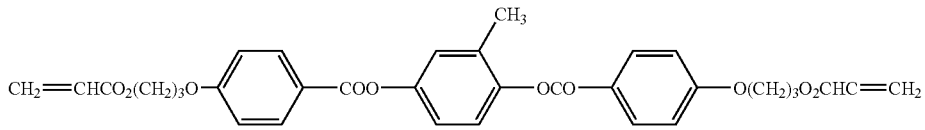
(c)

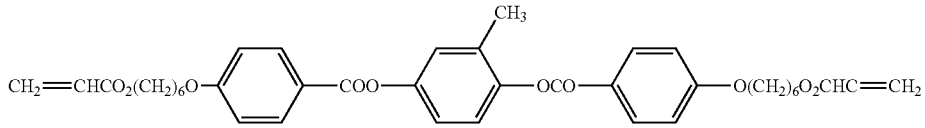
(d)

In the formula (1) shown in [Chem 1], $R^1$ and $R^2$ each denote hydrogen or a methyl group. In order to expand a range of temperature where the crosslinkable liquid crystal molecules exhibit a liquid crystal phase, either one of $R^1$ and $R^2$ is preferred to be hydrogen and more preferably both are hydrogen. X in the formula (1) and Y in the formula (2) may be any one of hydrogen, chlorine, bromine, iodine, an alkyl group having 1 to 4 carbon atoms, a methoxy group, a cyano group and a nitro group, and they are each preferably chlorine or a methyl group. Furthermore, a and b that denote chain lengths of alkylene groups between (meth)acryloyloxy groups at both terminals of a molecular chain of the formula (1) and aromatic rings thereof and d and e in the formula (2) may respectively independently take an arbitrary integer in the range of 2 to 12, preferably in the range of 4 to 10, and more preferably in the range of 6 to 9. Compounds (I) of the formula (1) where a=b=0 or compounds (II) of the formula (2) where d=e=0 are deficient in the stability and tend to be hydrolyzed, and additionally the compounds (I) or compounds (II) per se are high in the crystallinity. Furthermore, compounds (I) of the formula (1) or compounds (II) of the formula (2), where a and b or d (=e) respectively are 13 or more, are low in the isotropic phase transition temperature (TI). From the reasons, the compounds all are narrow in a temperature range (temperature range where a liquid crystal phase is maintained) that stably exhibits the liquid crystallinity. Accordingly, the compounds are not preferred to use in the liquid crystal composition of the invention.

As the crosslinkable liquid crystal molecules blended in the liquid crystal composition, monomers of liquid crystals having the polymerizability (crosslinkable liquid crystal) are exemplified in [Chem 1], [Chem 2], [Chem 3] and [Chem 4]. However, in the invention, oligomers of the polymerizable liquid crystals or polymers of crosslinkable liquid crystals may be used. Accordingly, known liquid crystal materials such as oligomers or polymers consisting of monomers such as shown in [Chem 1], [Chem 2], [Chem 3] and [Chem 4] may be appropriately selected and used.

(Silane Coupling Agent)

A silane coupling agent may be blended in the liquid crystal composition for forming a retardation layer such as mentioned above. As the silane coupling agents, mainly, one kind or two or more kinds of a silane coupling agent containing a sulfide group, a silane coupling agent containing a mercapto group, a silane coupling agent containing an amino group and a silane coupling agent containing a (meth)acryloyl group may be used. In particular, ones having a hydrophilic functional group are preferred. Furthermore, when a liquid crystal composition for forming a retardation layer is prepared, the silane coupling agent is preferably soluble in an organic solvent. Specifically, one kind or two or more kinds of silane coupling agents described below may be used. Furthermore, an amount of the silane coupling agent blended in the liquid crystal composition is preferred to be an amount to an extent that does not disturb the orientation of the liquid crystal. More specifically, when any one kind or two or more kinds of a silane coupling agent containing a sulfide group, a silane coupling agent containing a (meth)acryloyl group and a silane coupling agent containing a mercapto group is used, an amount of the silane coupling agent blended in the liquid crystal composition is substantially in the range of 0.001 to 8% and more preferably substantially in the range of 0.03 to 4% with respect to a liquid crystal material blended in the liquid crystal composition. On the other hand, a blending mount of the silane coupling agent containing an amino group in the liquid crystal composition is substantially in the range of 0.001 to 10% and more preferably substantially in the range of 0.01 to 5% with respect to a liquid crystal material contained in the liquid crystal composition. In the above, each of amounts of the silane coupling agents, expressed by %, added in the liquid crystal composition is based on a weight to an amount of liquid crystal molecules blended in the liquid crystal composition. Hereinbelow, a case when a value expressed by % is mentioned as one based on weight means similarly to the above.

It is preferable to add the silane coupling agent to a liquid crystal composition for forming a retardation layer because the adhesiveness between the formed retardation layer and a substrate surface is improved.

Furthermore, it is preferable that, in particular, a retardation layer is formed as a so-called C plate because a liquid crystal material constituting the retardation layer is excellently vertically aligned. In such a case, the vertical alignment aid and silane coupling agent may be blended in the liquid crystal composition. A liquid crystal composition to which the vertical alignment aid and/or silane coupling agent are blended may obtain extremely stable and excellent homeotropic alignment when a retardation layer is formed from the liquid crystal composition. As a result, an alignment film for promoting the orientation of the retardation layer may be omitted from forming, advantageously resulting in a decrease in the number of steps and in thinning a layer thickness.

More specific examples of the silane coupling agents are described below. Examples of the mercapto-based silane coupling agents include 3-mercaptopropylmethyldimethoxy silane (trade name: KBM-802, produced by Shin-Etsu Chemical Co., Ltd.), 3-mercaptopropyltrimethoxy silane (trade name: KBM-803, produced by Shin-Etsu Chemical Co., Ltd., trade name: TSL8380, produced by GE Toshiba Silicones), 3-mercaptopropyltriethoxy silane (trade name: SIM6475.0, produced by Gelest, Inc.), 11-mercaptoundecyltrimethoxy silane (trade name: SIM6480.0, produced by Gelest, Inc.), mercaptomethylmethyldiethoxy silane (trade name: SIM6473.0, produced by Gelest, Inc.) and S-(octanoyl)mercaptopropyltriethoxy silane (trade name: SIM6704.0, produced by Gelest, Inc.). Examples of the sulfide-based silane coupling agents include bis[3-(triethoxysilyl)propyl]tetrasulfide (trade name: KBE-846, produced by Shin-Etsu Chemical Co., Ltd.), bis[3-(triethoxysilyl)propyl]disulfide (trade name: SIB1824.6, produced by Gelest, Inc.) and bis[m-(2-triethoxysilylethyl)tolyl]polysulfide (trade name: SIB 1820.5, produced by Gelest, Inc.). Examples of the amino-based silane coupling agents include N-2(aminoethyl)-3-aminopropylmethyldimethoxy silane (trade name: KBM-602, produced by Shin-Etsu Chemical Co., Ltd. and Shin-Etsu Silicone Co., Ltd.), N-2(aminoethyl) 3-aminopropyltrimethoxy silane (trade name: KBM-603, produced by Shin-Etsu Chemical Co., Ltd. and Shin-Etsu Silicone Co., Ltd.), 3-aminopropyltrimethoxy silane (trade name: KBM-903, produced by Shin-Etsu Chemical Co., Ltd. and Shin-Etsu Silicone Co., Ltd.), γ-aminopropyltriethoxy silane (trade name: TSL-8331, produced by GE-Toshiba Silicone Co., Ltd.), N-β-aminoethyl)-γ-aminopropyltrimethoxy silane (trade name: TSL-8340, produced by GE-Toshiba Silicone Co., Ltd.), N-(β-aminoethyl)-γ-aminopropylmethyldimethoxy silane (trade name: TSL-8345, produced by GE-Toshiba Silicone Co., Ltd.), γ-(2-aminoethyl)aminopropyltrimethoxy silane (trade name: SH-6020, produced by Dow Corning) and γ-(2-aminoethyl)aminopropylmethyldimethoxy silane (trade name: SH-6023, produced by Dow Corning). Examples of the (meth)acryloyl-based silane coupling agents include 3-methacryloxypropylmethyldimethoxy silane (trade name: KBM-502, produced by Shin-Etsu Chemical Co., Ltd., trade name: TSL8375, produced by GE Toshiba Silicones), 3-methacryloxypropyltrimethoxy silane (trade name: KBM-503, produced by Shin-Etsu Chemical Co., Ltd., trade name: TSL8370, produced by GE Toshiba Silicones), 3-methacryloxypropylmethyldiethoxy silane (trade name: KBE-502, produced by Shin-Etsu Chemical Co., Ltd.), 3-methacryloxypropyltriethoxy silane (trade name: KBE-503, produced by Shin-Etsu Chemical Co., Ltd.), 3-acryloxypropyltrimethoxy silane (trade name: KBM-5103, produced by Shin-Etsu Chemical Co., Ltd.), (3-acryloxypropyl)trimethoxy silane (trade name: SIA0200.0, produced by Gelest, Inc.), methacryloxymethyltriethoxy silane (trade name: 6482.0, produced by Gelest, Inc.) and methacryloxymethyltrimethoxy silane (trade name: 6483.0, produced by Gelest, Inc.).

The silane coupling agents may be used in a combination of at least different two kinds of the same-series or in a combination of at least two kinds of the different series. In particular, as the silane coupling agents used in the invention, a silane coupling agent having an amino group is preferably used from the viewpoint of being capable of excellently realizing vertical alignment of the crosslinkable liquid crystal molecules in the retardation layer.

(Other Additives)

Furthermore, a photopolymerization initiator is preferably added in the liquid crystal composition within a range that does not damage the orientation of the liquid crystal. As the photopolymerization initiator, preferable is a radical polymerization initiator that absorbs energy of UV-ray to generate free radicals. A blending amount of the photopolymerization initiator is preferably substantially in the range of 0.01 to 15% (by weight) and more preferably substantially in the range of 0.5 to 10% (by weight).

Specific examples of the photopolymerization initiators include benzyl (also called as bibenzoyl), benzoin isobutyl ether, benzoin isopropyl ether, benzophenone, benzoyl benzoate, methyl benzoyl benzoate, 4-benzoyl-4'-methyldiphenyl sulfide, benzyl methyl ketal, dimethylaminomethyl benzoate, 2-n-buthoxyethyl-4-dimethylamino benzoate, p-dimethylamino benzoate isoamyl, 3,3'-dimethyl-4-methoxy benzophenone, methylobenzoyl formate, 2-methyl-1-(4-(methylthio)phenyl)-2-morpholinopropane-1-one, 2-benzyl-2-dimethylamino-1-(4-morpholinophenyl)-buthane-1-one, 1-(4-dodecylphenyl)-2-hydroxy-2-methylpropane-1-one, 1-hydroxycyclohexylphenyl ketone, 2-hydroxy-2-methyl-1-phenylpropane-1-one, 1-(4-isopropylphenyl)-2-hydroxy-2-methylpropane-1-one, 2-chlorothioxanthone, 2,4-diethylthioxanthone, 2,4-diisopropylthioxanthone, 2,4-dimethylthioxanthone, isopropylthioxanthone and 1-chloro-4-propoxythioxanthone.

(Columnar Structure)

Next, a columnar structure 4 formed on the retardation layer 3 will be described. The columnar structure 4 in the invention is a member that secures a predetermined gap (cell gap) between opposite substrates and the retardation controlling optical member 1 shown in FIG. 1 as one substrate when a cell having a retardation control function is formed by combining these substrates. For example, in the case of the cell being used as a liquid crystal cell, a liquid crystal cell is constituted in such a manner that, with the retardation controlling optical member 1 as a display side substrate, a predetermined gap is secured between the display side substrate and an opposite substrate and a driving liquid crystal material is filled between the substrates having a gap secured therebetween.

As a constituent component of the columnar structure, generally usable is a cured material of an ionizing radiation-curable resin composition, in particular, a cured material of a photosensitive resin composition. The above description does not eliminate to use other various kinds of raw materials as the constituent component of the columnar structure. However, the cured materials are preferably used from the viewpoints of being able to readily form a columnar structure having preferable hardness and of consuming relatively less heat that is applied to a formation target when a columnar structure is formed. As the photosensitive resin composition, photosensitive resins having a reactive vinyl group such as an acrylate-series, a methacrylate-series, a polycinnamic acid vinyl-series and a cyclized rubber-series may be used, and acrylate-series photosensitive resins are particularly preferably used. The ionizing radiation-curable resin in the invention means a resin that causes a crosslinking polymerization reaction when ionizing radiation is illuminated. Furthermore, the ionizing radiation in the specification includes both of electromagnetic waves including UV-ray and so on and a particle beam including an electron beam and so on, which have energy quanta capable of polymerizing molecules.

As a method of forming the columnar structure 4, various kinds of known methods such as a photolithography method, a screen printing method and a transfer method may be used. For example, by use of the photolithography method, a columnar structure 4 is formed as described below. In the beginning, a usable columnar structure constituent component such as the ionizing radiation-curable resin, and as needs arise, a solvent, a diluent or a monomer, etc. or an appropriate additive are mixed together to prepare a columnar structure-forming paint composition or ink composition. The paint composition or ink composition is coated substantially uniformly on the retardation layer 3, dried and subjected to a predetermined pattern exposure, followed by developing. As a result, a columnar structure 4 having a desired shape is formed on the retardation layer 3. For example, a columnar structure 4 is formed according to a method disclosed in a previously-publicized JP-A No. 2005-3750. Furthermore, in the screen printing method, a columnar structure 4 is formed such that the ink composition is recoated on a position where the columnar structure 4 is destined to form. Still furthermore, according to the transfer method, a columnar structure 4 is formed as described below. In the beginning, a resin that constitutes a columnar structure 4 is used to form a pattern of the columnar structure 4 on a printing roll. Then, the printing roll is rotated on the retardation layer 3 to transfer the pattern of the columnar structure 4 on the retardation layer 3, whereby the columnar structure 4 is formed. An example of the existing method of the transfer method is disclosed in JP-A No. 2006-178427.

The columnar structure 4 formed as mentioned above is required to have a certain degree hardness from the purpose of realizing to maintain a predetermined distance (that is, cell gap) between the substrates. Accordingly, it is preferable to select, from among the above-described constituent components of the columnar structure, in particular, one capable of exhibiting desired hardness. More specifically, the hardness of the constituent component is desirably substantially in the range of 2H to 5H by pencil hardness.

The pencil hardness described in the specification is measured in accordance with a test method of JIS K5600-5-4 by use of a sample prepared under conditions described below, with whether a bruise is visually confirmed or not on a surface of a coating film as an index.

In order to obtain a sample supplied to a measurement test of the pencil hardness, first, the constituent component is suspended in an appropriate solvent to prepare a solution. Then, the solution is coated on a glass substrate to form a coating film, and the coating film is irradiated with UV-ray for 10 sec by use of a 18 kW ultrahigh pressure mercury lamp according to a proximity method from a position of 100 $\mu M$ from the coated surface so as to cure the constituent component. Thereafter, the sample is baked at 200° C. for 30 min to completely finish a curing reaction, whereby a target sample is prepared. An amount of the solution coated on the glass substrate is controlled so that the film thickness after baking is 2.0 $\mu m$.

The pencil hardness of the liquid crystal composition that contains crosslinkable liquid crystal molecules used to constitute the retardation layer is also measured similarly to the above-mentioned method. The liquid crystal composition, depending on properties of the crosslinkable liquid crystal molecules contained therein, generally has the hardness measured according to the measurement test substantially in the range of 6B or more and B or less. Accordingly, a retardation layer is generally formed significantly softer than a columnar structure formed with sufficient hardness to maintain a cell gap. As a result, conventionally, when pressure is externally applied in a thickness direction in a cell that is formed by combining a retardation controlling optical member where a sufficiently hard columnar structure is formed on the retardation layer as one substrate and an opposite substrate, the following problems are generated. That is, in an existing columnar structure and retardation layer, the hard columnar structure subsides in the softer retardation layer to locally cause a variation of the cell gap.

On the other hand, in the invention, a sum total of areas of lower bottom surfaces of columnar structures disposed on a retardation layer and in an effective display region is set to 0.3% or more, and preferably to 0.35% or more, with respect to an area of the effective display region, whereby an area ratio of the lower bottom surfaces of the columnar structures to the retardation layer surface is secured sufficiently large. Accordingly, in a liquid crystal cell formed by adhering a retardation controlling optical member of the invention as one substrate and another substrate, a load transmitted between the lower bottom surface of the columnar structure and the retardation layer surface is dispersed even when a user applies external pressure in a thickness direction of the liquid crystal cell during use. Consequently, even when the external pressure is applied, the columnar structure 4 is sufficiently inhibited from subsiding in the retardation layer 3.

However, problems that are caused when a sum total of lower bottom surfaces of columns is set too larger, in some cases, have to be taken into consideration.

That is, an increase in a sum total of lower bottom surface areas of columnar structures 3 that have substantially the same sectional area in a height direction such as a cylinder leads to an increase in a sum total of volumes of the columnar structures 3. For this reason, there is a fear in that, in a filling space of a driving liquid crystal material, which is secured by the columnar structures 3, the columnar structures cause physical disturbance at the time of filling the driving liquid crystal material to increase a filling time of the driving liquid crystal material, thereby to decrease the production efficiency. Accordingly, when considering the problems, a sum total of lower bottom areas of the columnar structures 4 is set to preferably 7% or less, more preferably 5% or less, and still more preferably 4% or less with respect to an area of a retardation layer surface. When a sum total of lower bottom areas of the columnar structures 4 is set in the preferable range, the stiffness in a thickness direction of the liquid crystal cell is made sufficiently strong and it is possible to eliminate a fear that the columnar structures 4 become physical disturbance when the driving liquid crystal material is filled to deteriorate the productivity.

A sum total of the lower bottom areas of the columnar structures 4 is obtained by summing up bottom areas based on a design of the respective columnar structures formed by appropriately controlling by design in various kinds of columnar structure-forming methods such as the photolithography method, screen printing method and transfer method. Furthermore, a sum total of areas of lower bottom portions of the columnar structures of an optical member where columnar structures have been formed on a retardation layer such as a retardation controlling optical member of the invention or in a liquid crystal cell assembled in a cell by use of the retardation controlling optical member can be obtained by observing the columnar structures with an ordinary optical microscope. Still furthermore, when the sum total of bottom portions is measured in more detail, a profilometer that makes use of interference due to laser or an electron microscope is used.

A height of the columnar structure in the invention (that is, a dimension of a columnar structure in a thickness direction of a retardation controlling optical member) is generally preferably in the range of about 0.5 to 10 μm. However, as mentioned above, the columnar structures in the invention are disposed to the effect that a cell gap that means a distance between opposite substrates is secured to a predetermined distance. Accordingly, a height of the columnar structure is appropriately determined by considering a desired distance between substrates.

A shape of the columnar structure in the invention may be formed in a shape with a substantially uniform cross sectional area in a height direction, like the cylindrical columnar structure 4 formed on the retardation layer 3 shown in, for example, FIG. 1. Another example of a columnar structure may be formed tapered so that an area of an upper bottom surface is smaller than an area of a lower bottom surface, like a columnar structure 4b shown in FIG. 2 below. In particular, in a columnar structure formed tapered like a columnar structure 4b, advantageous effects are exerted from the following reasons.

That is, an optical member where columnar structures are formed on a retardation layer like in the invention as one substrate and the other substrate may be faced and combined to form a liquid crystal cell. In this case, in a step of combining both the substrates, two substrates are adhered under definite pressure applied in a direction where both the substrates face each other. At that time, it is preferable that, even when there is a small production-related error in the height of the columnar structure, an upper bottom surface of the columnar structure comes into contact with an opposite substrate, and the columnar structure is a little collapsed to secure a margin in a substrate adhering step, resulting in combination of substrates that face excellently and uniformly. Accordingly, from the viewpoint, an area of an upper bottom surface of the columnar structure is desirably appropriately small. For example, it is preferred that a cylindrical columnar structure designed slenderly in accordance with an area of an upper bottom surface is formed and the slenderly formed columnar structure is a little collapsed owing to external pressure to appropriately obtain the margin.

In the invention, however, when a columnar structure having a substantially constant cross section from a lower bottom surface to an upper bottom surface is adopted and lower bottom areas of the respective columnar structures are expanded to increase a sum total of areas of the lower bottom surfaces, an area of an upper bottom surface is simultaneously expanded to result in heightening the stiffness of the columnar structure, which makes it difficult in some cases to obtain the margin.

From the viewpoint, a columnar structure in the invention, in which an area of a lower bottom surface is disposed larger, is formed tapered so that an upper portion in a height direction may be slender. Furthermore, an upper portion of the columnar structure is formed as a buffering region smaller in the stiffness than other portions. Thereby, a margin when the two substrates are adhered is obtained in the buffering region. An amount w of the desired margin is calculated from formula (1) below. The amount w is, though variable depending on the respective constituent layers and constituent members of the retardation controlling optical member or pressure in the adhering step, desirably designed so as to be able to secure w generally substantially in the range of 5 to 9.5% and more desirably designed so as to be able to obtain the margin substantially in the range of 6.5 to 9%.

$$w=(d1-d2)/h \times 100 \qquad (1)$$

wherein d1 is a total thickness of a retardation controlling optical member (that is, a distance from a substrate bottom surface to an upper bottom surface of the columnar structure before substrates are adhered);

d2 is a total thickness of the retardation controlling optical member after the substrates are adhered (that is, a distance from a substrate bottom surface to an upper bottom surface of the columnar structure after the substrates are adhered); and h is a unevenness difference of the retardation controlling optical member before the substrates are adhered (that is, a distance from an upper surface of the retardation layer to an upper bottom surface of the columnar structure).

According to the columnar structure in the invention provided with a slender buffering region, the buffering region is collapsed during the step of adhering two substrates, thereby to excellently secure a margin at the adhering. That is, pressure that is applied between both substrates when two substrates are adhered is generally sufficiently smaller than pressure or test pressure assumed to be applied externally on a liquid crystal panel that uses a liquid crystal cell thus formed. Accordingly, an amount by which a columnar structure is desirably deformed in the adhering step (that is, the w) is very small. However, by obtaining a very slight deformation amount of the columnar structure, the cell gap unevenness in the step of adhering the substrates is eliminated.

In addition, since the buffering region has been collapsed after the adhering step, the buffering action to further applied pressure is hardly exerted. Accordingly, it is possible to sufficiently receive a first advantage of the invention in that, even when external pressure is applied in a thickness direction of a liquid crystal cell after the liquid crystal cell is formed, the cell gap is maintained substantially uniform.

In the above, the lower bottom areas or the like of the columnar structure are described by taking, as an example, the invention in an aspect where a columnar structure is directly formed on a surface of a retardation layer. However, what is mentioned above does not completely eliminate from the invention an aspect where a layer is further formed on an upper surface of the retardation layer, followed by forming a columnar structure. That is, even in such a case, since an arbitrary layer formed on the retardation layer is very thin and so on, the invention is effective in a retardation controlling optical member where a load transmitted from a lower bottom surface of the columnar structure substantially affects on the retardation layer. In other words, a retardation controlling optical member of the invention includes an aspect where an arbitrary layer is further present between the retardation layer and the columnar structure and a load transmitted from a lower bottom surface of the columnar structure affects substantially on the retardation layer. More specifically, a retardation controlling optical member for use in a VA-mode liquid crystal display device is cited. In a retardation controlling optical member for VA-mode, it is general that an ITO electrode is formed on a retardation layer and a columnar structure is formed on the ITO electrode. At that time, since the ITO electrode is a very thin film such as substantially 0.15 μm, a load transmitted from a lower bottom surface of the columnar structure is transmitted through the ITO electrode substantially to a retardation layer. Accordingly, in the case of such an aspect, the invention is effective. In other words, the invention includes also an aspect where an ITO electrode is formed on a retardation layer and a columnar structure is formed on an upper surface of the ITO electrode.

No limitation is made to the method of forming a shape of the columnar structure in the invention in a tapered shape where a lower bottom surface that comes into contact with a retardation layer is formed greater than an upper bottom surface as mentioned above. In the case where, for example, a photolithography method is used as a method of forming a columnar structure, a gap between a photomask and a substrate to be exposed (exposure gap) may be controlled during exposure thereby to control a taper amount. That is, when an exposure gap is expanded, a diffraction phenomenon of an exposure light beam from an aperture of a mask becomes larger to be likely to form a tapered portion.

Still furthermore, according to an aspect of the invention where a columnar structure is formed tapered, driving liquid crystal may be excellently aligned. That is, when a columnar structure such as a cylinder or a quadrangular prism having a substantially uniform cross section is adopted, a substantially vertical relationship is established between a retardation layer surface in contact with a lower bottom surface of a columnar structure and a side surface of the columnar structure, and between an opposite substrate surface in contact with an upper bottom surface of the columnar structure and a side surface of the columnar structure. Here, although the driving liquid crystal material is stipulated in an alignment direction by alignment films disposed on an upper surface of a retardation layer and an upper surface of a substrate that face each other, the alignment defined by the retardation layer surface and the substrate surface is a little disturbed owing to a vertically erected columnar structure. As a result, when a panel is assembled, the light leakage may occur during black display in the proximity of the side surface of the columnar structure. On the other hand, when the columnar structure is formed tapered, the side surface thereof gradually varies between the retardation layer surface and substrate surface that face each other, so that there is no fear of disturbing the alignment of the driving liquid crystal material.

Assume that a height of a columnar structure is 100% that is measured in a direction from a lower surface (that is, a lower bottom surface of the columnar structure) that comes into contact with a retardation layer toward the other bottom surface (that is, a upper bottom surface of a columnar structure). In this case, a cross sectional area of the tapered columnar structure cut at a height of 90% from the lower bottom surface is preferably 3% or more and 30% or less, and more preferably 5% or more and 20% or less of the area of the lower bottom surface. According to the tapered columnar structure having a cross sectional area in the preferable range, a cell gap defined by the columnar structure is excellently maintained even when external pressure is applied, and a margin when the cell is assembled is excellently obtained. When a cross sectional area of the columnar structure cut at a height of 90% from the lower bottom surface is less than 3% of the lower bottom surface, an upper portion of the columnar structure is excessively slender and a collapsing amount of the upper bottom surface of the columnar structure at the cell assembling becomes unnecessarily larger. For this reason, a desired amount of space may not be secured in a space where a driving liquid crystal material is filled. On the other hand, when the range of numerical value exceeds 30%, an area of the upper bottom surface of the columnar structure becomes excessively large, so that a sufficient margin may not be secured during a cell assembling step.

In a generally executed step of adhering substrates, a region where a tapered columnar structure mainly collapses is, as mentioned above, an upper portion of a taper formed as a buffering region (a portion of 90% or more in the height of the columnar structure). Furthermore, a collapsing amount in the buffering region is very slight such as substantially several % in a height dimension of the columnar structure. Accordingly, with respect to the "90% height" of the columnar structure specified in the invention, a height after the cell is assembled becomes lower by substantially several % when compared between before and after the cell assemblage, but a variation of the cross sectional area of the "90% height" in the height variation is very small. Accordingly, a range of a preferable cross sectional area in the 90% height of a columnar structure specified in the invention has no problem in using as an index for specifying whether it is a preferable taper shape intended in the invention or not, in both of the columnar structures before and after the adhering step.

In the invention, a local variation of a cell gap may be evaluated by a loading and unloading test described below.

The loading and unloading test includes a loading step and an unloading step. In the loading step, an indenter having a tip surface formed planar is brought into contact, at the tip surface thereof, with an upper bottom surface of a columnar structure, and a load of $3\times10^4$ kgf/m$^2$ is applied to a retardation-controlling optical member in a direction from the upper bottom surface of the columnar structure toward a lower bottom surface thereof. In the unloading step, the load is removed. The loading and unloading test further includes a test for specifying thicknesses of the retardation-controlling optical member before and after the loading and unloading test.

When executing the loading and unloading test, in the beginning, a test piece of a retardation-controlling optical member (for example, dimension: length 10 cm×width 10 cm, thickness of substrate: 700 μm and thickness of retardation layer: 1.5 μm, and the number of columnar structures disposed: N (N is a positive rational number appropriately determined responding to test pieces)) was used to measure a total thickness (hereinafter, in some cases, simply referred to as "D1") of the retardation-controlling optical member (shown by D1 in FIG. 1). At that time, a total thickness of the retardation-controlling optical member shows a thickness in a laminating direction of an entire layer structure laminated on a substrate in the retardation-controlling optical member, the thickness including a height (length) of a columnar structure. On the other hand, among the columnar structures (N pieces) formed on the test piece, arbitrary columnar structures (n pieces) are selected. Then, as for the unevenness formed on a surface of the retardation-controlling optical member by the selected columnar structures, measured is a value of difference of the unevenness of the retardation-controlling optical member before the loading step (hereinafter, in some cases, simply referred to as "H") is carried out (H in FIG. 1). A value of difference of unevenness is specifically measured by use of a stylus type profilometer, an optical interferometer or the like. A value of difference of the unevenness (H) of the retardation-controlling optical member is specified as well by subtracting thicknesses of the respective layers (retardation layer and so on) other than the columnar structure from a total thickness (D1) of the retardation-controlling optical member.

Next, by use of a micro-hardness tester (such as Fischer Scope H-100 (trade name), produced by H. Fischer Inc.), a tip surface of an indenter that is formed of diamond and has a planar tip surface formed in a square having one side of 100 μm is brought into contact in front of an upper bottom of the columnar structures (n pieces) arbitrarily selected from the columnar structures (N pieces) formed on the test piece. Then, as described below, the indenter applies a load to the test piece in a direction from an upper bottom surface of the columnar structure to a lower bottom surface thereof (loading process). As the indenter, one obtained by processing a Vickers indenter into the foregoing shape is adopted.

In the loading process, a load applied on the test piece is increased at 2 mN/sec up to the maximum load (Q(mJ)). Assuming that a load of $3\times10^4$ kgf/m$^2$ is applied evenly on the columnar structures (N pieces) disposed per an area of 100 cm$^2$ of the test piece, the maximum load Q is determined in accordance with a test piece as a value (300×9.8/(N/n)×1000 (mN)) of a load applied per number of pieces (n pieces) of the columnar structures to which the load is applied from the indenter. Furthermore, when the load applied to the test piece reaches the maximum load, the state is maintained for 5 sec.

Thereafter, the load applied on the test piece is reversely decreased at 2 mN/sec until the load applied on the test piece is removed (unloaded) to be 0 mN (unloading process). Then, when the load applied to the test piece becomes 0 mN, the state is once more held for 5 sec. Thereafter, a total thickness of the retardation-controlling optical member that is a test piece, that is, a thickness from a substrate lower bottom surface to an upper bottom surface of the columnar structure (hereinafter, in some case, simply referred to as "D2") is measured. The loading and unloading test indicates that, when the retardation-controlling optical member is plastically deformed such as the columnar structure per se is plastically deformed or the columnar structure partially subsides in the retardation layer to plastically deform the retardation layer, the larger the plastic deformation of the retardation-controlling optical member is, the larger the difference value between D1 and D2 becomes.

Thus, execution of the loading and unloading test determines a total thickness (D1) of the retardation-controlling optical member before the loading process is applied and a total thickness (D2) of the retardation-controlling optical member after the unloading process is carried out. As a difference value of the values, a variation amount (ΔH) of a total thickness of the retardation-controlling optical member is calculated from a formula shown below.

That is, a plastic deformation rate (W (%)) in the invention is determined from formula (2) below by use of H and ΔH obtained by the loading and unloading test.

$$W=\Delta H/H\times 100 \qquad (2)$$

The plastic deformation rate (W) is desirably a value in a range that maintains the brightness unevenness of a liquid crystal display screen when a retardation-controlling optical member is assembled in a liquid crystal display to an extent that does not allow an observer to recognize the brightness unevenness, and specifically, ideal to be 15% or less. That is, as mentioned above, when a display region in a liquid crystal display is partially locally deformed (deteriorated) more than 15%, the light transmittance of the portion varies (deteriorates) more than substantially 4%. This reaches a variation in the light transmittance to an extent that an observer may recognize as the brightness unevenness. When a magnitude of the plastic variation of the cell gap exceeds 15% relative to a value of a cell gap designed to a desired thickness, a state where the brightness unevenness generated in a display image is instantly recognized by an observer is generated not temporarily but continuously.

When, in the retardation-controlling optical member, the hardness is compared between the retardation layer and the columnar structure, generally, the retardation layer is overwhelmingly softer than the columnar structure. Therefore, since an amount of the plastic deformation is considered almost made of an amount by which the columnar structure subsides in a retardation layer direction, a length of the columnar structure per se is considered hardly varied.

Next, a liquid crystal display device 17 where a retardation-controlling optical member of the invention is used as a display side substrate of an IPS liquid crystal display will be described with reference to FIG. 2.

In a retardation-controlling optical member of the invention shown in FIG. 2, light shielding regions 5 are formed in a desired pattern on a substrate 2, and a red transparent colored region 6(R), a green transparent colored region 6(G) and a blue transparent colored region 6(B) are formed between light shielding regions 5, whereby a colored layer 6 is formed.

With the colored layer 6 as a base material, a retardation layer 3 is formed on the colored layer 6, and then, a tapered columnar structure 4b is formed on the retardation layer 3 and above the respective light shielding regions 5. In order to impart desired orientation to a driving liquid crystal material, an alignment film 14 is disposed on an upper surface of a retardation-controlling optical member.

On the other hand, a transparent electrode material made of indium and tin is coated by sputtering or the like on an upper bottom surface of a glass substrate 12 in a liquid crystal drive side substrate 16, thereby to form an ITO 13. An alignment film 14 to impart desired orientation to a driving liquid crystal material is formed also on an upper surface of the ITO 13 of the liquid crystal drive side substrate 16.

Next, a display side substrate that is a retardation-controlling optical member and the liquid crystal drive side substrate 16 are combined in an opposite state with the retardation layer 3 and the ITO 13, respectively, disposed inside thereof, and they are adhered under definite pressure. An upper bottom surface of the columnar structure 4b is brought into contact with the liquid crystal drive side substrate 16, thereby securing a space where a driving liquid crystal material is filled. In the adhering step, as mentioned above, the proximity of the upper bottom surface of the columnar structure 4b comes into contact with the liquid crystal drive side substrate 16 and is a little collapsed, whereby an excellent margin in a combination with the liquid crystal cell 17 is secured. Then, a driving liquid crystal material is filled in a space secured between both the substrates to form a drive liquid crystal layer 31, and thereby, a liquid crystal display device 17 is completed.

FIG. 2 describes an aspect where the light shielding region 5 and the colored layer 6 made of the transparent colored regions 6(R), 6(G) and 6(B) are formed on the substrate 2, and then the retardation layer 3 is formed thereon. Thus, a retardation layer in a retardation-controlling optical member of the invention may be formed directly on a substrate. Alternatively, transparent colored regions and so on are formed in advance on a substrate, and with this as a base material surface, a retardation layer may be further formed. The light shielding region 5 and transparent colored regions 6(R), 6(G) and 6(B) will be more detailed hereinbelow.

In FIG. 2, the colored layer 6 made of the light shielding region 5 and transparent colored regions 6(R), 6(G) and 6(B) is employed. However, when a colored layer is formed in the invention, a colored layer made of only at least two kinds of transparent colored regions may be constituted, that is, a light shielding region may be appropriately omitted.

The light shielding region 5 may be disposed on a predetermined position or in a predetermined pattern on an upper surface of an appropriate base material such as a substrate 2 so as to correspond to arrangement of sub-pixels that are respective transparent colored regions 6(R), 6(G) and 6(B) disposed after the light shielding region 5, and to partition the sub-pixels. Furthermore, in order to partition an effective display region of an optical member and the outside thereof on a substrate, a frame-like light shielding region may be further disposed in a periphery of the effective display region (not shown in the drawing).

The light shielding region 5 is formed in such a manner that a metal thin film having the light shielding property or light absorbing property such as a metallic chrome thin film or a tungsten thin film is formed on a transparent substrate 2 by patterning in a desired shape such as a rectangular lattice, stripe or triangular lattice. Furthermore, an organic material such as a black resin may be printed in a predetermined shape by means of a transfer method or the like to form the light shielding region.

However, depending on applications or optical specification of the retardation-controlling optical member of the invention, the light shielding region 5 may be made unnecessary, and even when it is used, other than a rectangular lattice shape, a stripe shape or triangular lattice shape may be used in some cases.

A columnar structure in a retardation-controlling optical member may be formed into a shape such as a cylinder shape having a substantially uniform cross sectional area in a height direction. In this case, when a liquid crystal panel is constituted by use of the optical member, a driving liquid crystal material filled in the liquid crystal panel may show a little alignment defect in the proximity of a side surface of the columnar structure in the invention. As a result, the light leakage may be generated in the neighborhood of a side surface of the columnar structure during the black display, as mentioned above. On the other hand, as shown in FIG. 2, the columnar structure 4b is formed above the light shielding region 5 in a retardation-controlling optical member of the invention having the colored layer 6 provided thereon. This configuration is preferable because, even when disturbance of the orientation of a driving liquid crystal material, which causes the light leakage, is generated, the light shielding region 5 inhibits the light leakage from occurring.

However, the description does not restrict the formation of the columnar structure always to above the light shielding region in the invention that is provided with the light shielding region. It is important that the columnar structure in the invention is formed at least on the retardation layer; when combined with an opposite substrate, secures a predetermined distance between substrates; and even when external pressure is applied in a thickness direction between the substrates, substantially maintains the distance.

The transparent colored regions 6(R), 6(G) and 6(B) formed after the light shielding region 5 is formed are formed by disposing coloring pixels that allow transmitting lights of wavelength bands of the respective colors of red, green and blue in a predetermined pattern. As arrangements of sub-pixels of red (R), sub-pixels of (G) and sub-pixels of (B) that constitute the colored pixels, various arrangement patterns such as a stripe shape, a mosaic shape and a triangle shape may be selected. More specifically, for each colored pixel of the respective colors, a coating film of a coloring material dispersion obtained by dispersing a coloring material in a solvent is patterned into a predetermined pattern by means of, for example, a photolithography method. As another method, a coloring material dispersion is coated in a predetermined shape by use of an inkjet method for each colored pixel of the respective colors. In addition, in place of the sub-pixels of red (R), sub-pixels of (G) and sub-pixels of (B), colored pixels that allow transmitting lights of wavelength bands of complimentary colors of the respective colors may be used to form transparent colored regions, and the number of colors used may be single, two or four or more.

When transparent colored regions of at least two different colors are disposed on a substrate in a retardation-controlling optical member of the invention, the optical member of the invention is preferably used as color filters for various kinds of displays.

EXAMPLES

Example 1

Formation of Colored Layer

With alkali-free glass (trade name: NA35, produced by NH Technoglass Co., Ltd.) as a substrate, first, a light shielding region was formed, and then, transparent colored regions of red, green and blue color were formed between the light shielding regions by use of colored resists shown below according to a general photolithography process, thereby to constitute a colored layer having a thickness of substantially 2.0 μM.

(Preparation of Colored Resist)

In order to form a light shielding region and transparent colored regions of three colors of red (R), green (G) and blue (B), pigment dispersion photoresists shown below were used as coloring materials. The pigment dispersion photoresist was obtained in such a manner that, with a pigment as a coloring material, beads were added to a dispersion composition (containing a pigment, a dispersing agent and a solvent), and the mixture was dispersed for 3 hr by a dispersing unit, followed by mixing a dispersion from which the beads had been removed and a clear resist composition (containing a polymer, a monomer, an additive, an initiator and a solvent). The compositions thereof are shown below. A paint shaker was used as the dispersing unit.

(Light Shielding Region-Forming Photoresist)
Black pigment . . . 14.0 parts by weight
(trade name: TM Black #9550, produced by Dainichiseika Color & Chemicals Mfg. Co., Ltd.)
Dispersing agent . . . 1.2 parts by weight
(trade name: Disperbyk 111, produced by Big Chemie)
Polymer . . . 2.8 parts by weight
(trade name: VR60, produced by Showa Highpolymer Co., Ltd.)
Monomer . . . 3.5 parts by weight
(trade name: SR399, produced by Sartomer Company)
Additive . . . 0.7 part by weight
(trade name: L-20, produced by Soken Chemical & Engineering Co., Ltd.)
Initiator . . . 1.6 parts by weight
(2-benzyl-2-dimethylamino-1-(4-molpholinophenyl)-butanone-1)
Initiator . . . 0.3 part by weight
(4,4'-diethylaminobenzophenone)
Initiator . . . 0.1 part by weight
(2,4-diethylthioxanthone)
Solvent . . . 75.8 parts by weight
(ethylene glycol monobutylether)

(Red (R) Transparent Colored Region-forming Photoresist)
Red pigment . . . 3.5 parts by weight
(C. I. PR254 (trade name: Chromophthal DPP Red BP, produced by Ciba Specialty Chemicals Co., Ltd.)
Yellow pigment . . . 0.6 part by weight
(C. I. PY139 (trade name: Paliotol Yellow D1819, produced by BASF AG)
Dispersing agent . . . 3.0 parts by weight
(trade name: Solsperse 24000, produced by Zeneca Inc.)
Monomer . . . 4.0 parts by weight
(trade name: SR399, produced by Sartomer Company)
Polymer 1 . . . 5.0 parts by weight
Initiator . . . 1.4 parts by weight
(trade name: Irgacure 907, produced by Ciba-Geigy Co., Ltd.)
Initiator . . . 0.6 part by weight
(2,2'-bis(o-chlorophenyl)-4,5,4',5'-tetraphenyl-1,2'-biimidazole)
Solvent . . . 81.9 parts by weight
(propylene glycol monomethyl ether acetate)

(Green (G) Transparent Colored Region-forming Photoresist)
Green pigment . . . 3.7 parts by weight
(C. I. PG7 (trade name: Seika Fast Green 5316P, produced by Dainichiseika Color & Chemicals Mfg. Co., Ltd.)
Yellow pigment . . . 2.3 parts by weight
(C. I. PY139 (trade name: Paliotol Yellow D1819, produced by BASF AG)
Dispersing agent . . . 3.0 parts by weight
(trade name: Solsperse 24000, produced by Zeneca Inc.)
Monomer . . . 4.0 parts by weight
(trade name: SR399, produced by Sartomer Company)
Polymer 1 . . . 5.0 parts by weight
Initiator . . . 1.4 parts by weight
(trade name: Irgacure 907, produced by Ciba-Geigy Co., Ltd.)
Initiator . . . 0.6 part by weight
(2,2'-bis(o-chlorophenyl)-4,5,4',5'-tetraphenyl-1,2'-biimidazole)
Solvent . . . 80.0 parts by weight
(propylene glycol monomethyl ether acetate)

(Blue (B) Transparent Colored Region-forming Photoresist)
Blue pigment . . . 4.6 parts by weight
(C. I. PB 15:6 (trade name: Heliogen blue L6700F, produced by BASF AG)
Violet pigment . . . 1.4 parts by weight
(C. I. PV23 (trade name: Foster Perm RL-NF, produced by Clariant Co., Ltd.)
Pigment derivative . . . 0.6 part by weight
(trade name: Solsperse 12000, produced by Zeneca Inc.)
Dispersing agent . . . 2.4 parts by weight
(trade name: Solsperse 24000, produced by Zeneca Inc.)
Monomer . . . 4.0 parts by weight
(trade name: SR399, produced by Sartomer Company)
Polymer 1 . . . 5.0 parts by weight
Initiator . . . 1.4 parts by weight
(trade name: Irgacure 907, produced by Ciba-Geigy Co., Ltd.)
Initiator . . . 0.6 part by weight
(2,2'-bis(o-chlorophenyl)-4,5,4',5'-tetraphenyl-1,2'-biimidazole)
Solvent . . . 80.0 parts by weight
(propylene glycol monomethyl ether acetate)

The polymer 1 described in the specification is obtained by adding 16.9% by mole of 2-methacryloyloxyethyl isocyanate to 100% by mole of a copolymer of benzyl methacrylate:styrene:acrylic acid:2-hydroxyethyl methacrylate=15.6:37.0:30.5:16.9 (mole ratio) and has a weight average molecular weight of 42500.

(Formation of Vertical Alignment Film)

Subsequently, in order to form a so-called positive C plate as a retardation layer on the colored layer, a vertical alignment film was first formed.

Specifically, JALS2021 (trade name, produced by JSR Corporation) as an alignment film material is patterned on the colored layer by means of a flexo printing method, followed by baking at 200° C. for 1 hr to form a vertical alignment film having a thickness of 700 Å, whereby a base substrate was obtained. At this time, a protective layer made of a transparent resin may be disposed between the colored layer and the alignment film. This is because a step of a color filter is mitigated to obtain more secure liquid crystal orientation.

(Preparation of Liquid Crystal Composition)

A liquid crystalline polymer-containing resin composition that constitutes a retardation-controlling functional layer was prepared as follows.

C Plate-Forming Photosensitive Resin Composition
Crosslinkable Liquid Crystal Molecule Four kinds of crosslinkable liquid crystal molecules expressed by (a) to (d) shown in [Chem 4] and exhibiting a nematic liquid crystal phase were used at a composition ratio below.

| | |
|---|---|
| Chem 4 (a) | 8.3 parts by weight |
| Chem 4 (b) | 4.7 parts by weight |
| Chem 4 (c) | 5.4 parts by weight |
| Chem 4 (d) | 5.4 parts by weight |
| Photopolymerization initiator (trade name: Irgacure 907, produced by Ciba Specialty Chemicals) | 1.3 parts by weight |
| Solvent (chlorobenzene) | 74.9 parts by weight |

(Film Formation of Retardation Layer)

The liquid crystal composition prepared above was coated on the base substrate on which an alignment film was formed by means of a spin coating method, thereby to form a liquid crystal coating film. In the example, the spin coating method was applied. However, the method is not limited thereto as far as a liquid crystal composition may be coated uniformly on a base material, and a die coating method, a slit coating method and a combination thereof may be used without restriction.

Subsequently, the substrate was placed on a hot plate and heated at 100° C. for 5 min to remove a remaining solvent to develop a liquid crystal structure. Then, UV-ray was illuminated to an entire surface of the liquid crystal coating film by use of a UV-ray illuminator having an ultrahigh pressure mercury lamp (trade name: TOSCURE 751, produced by Harrison Toshiba Lighting Co., Ltd.) under conditions of 10 mW/cm$^2$, 365 nm and 60 sec. Thereby, liquid crystal molecules present in the liquid crystal coating film were induced to crosslink to cure. Then, the liquid crystal coating film was heated and baked on a hot plate at 200° C. for 15 min to completely finish a curing reaction, thereby to obtain a retardation layer of a positive C plate with a thickness of 1.2 μm. The pencil hardness of the liquid crystal composition was 3B.

(Constitution of Columnar Structure)

In the beginning, a UV-curable transparent negative resist (trade name: NN700, produced by JSR Corporation) was used as a columnar structure-forming resin composition constituting a columnar structure, and the columnar structure-forming resin composition was coated by a spin coating method on a retardation layer and dried to form a coating film.

Next, with a photomask disposed at a position 100 μm distanced from the coating film, UV-ray was illuminated for 10 sec to a portion of the coating film on the retardation layer surface, serving as a position scheduled previously to form a columnar structure, by use of a 18.0 kW ultrahigh pressure mercury lamp of a proximity aligner. Thereby, the UV-illuminated portion of the coating film was cured. The position scheduled to form a columnar structure was selected and determined in advance in a region that was a portion on the coating film and overlapped with the light shielding region in a plain view. Further, as the position scheduled to form a columnar structure, 80,000 positions were selected for an area of 100 cm$^2$ of a glass substrate. Furthermore, as to the respective positions of 80,000 positions, similarly, one position is additionally selected at a position that was 50 μm distanced in a horizontal direction to a photoresist pattern extending in one direction based on a center portion of the selected positions and did not overlap with a region of a pixel in plain view. Consequently, 160,000 positions were selected in total.

Thereafter, the coating film was dipped in an aqueous solution of 0.05% by weight of potassium hydroxide (liquid temperature: 23° C.) for 1 min to execute alkali development, whereby an uncured portion of the coating film was removed. Further, the base material having the coating film from which the uncured portion had been removed was left in an atmosphere of 200° C. for 30 min to apply a heat treatment, and thereby a portion of the coating film remained without alkali developing was rendered a columnar structure. Thus, a columnar structure having a cylindrical shape with a dimension of a lower bottom surface of 10μφ of a columnar structure, which corresponded to an end portion in contact with a retardation layer, and a height of 3.5 μm was obtained.

From the above, a retardation-controlling optical member was formed so that 160,000 pieces per 100 cm$^2$ were disposed on a retardation layer and an occupation area rate of a lower bottom surface area of the columnar structures to a surface area of the retardation layer was 0.50%, and this was taken as Example 1. The pencil hardness of the columnar structure-forming resin composition constituting the columnar structure was 4H.

Example 2

In Example 2, a retardation-controlling optical member was formed in the same manner as in Example 1, except that a shape of a columnar structure was formed into a cylinder having a lower bottom surface of 12μφ; only 80,000 positions were selected per 100 cm$^2$ on a retardation layer as positions scheduled to form columnar structures, without executing additive selection of one position to each of 80,000 positions; the number of the columnar structures disposed was set to 80,000 positions; and an occupation area rate of the lower bottom surface of the columnar structures to the surface area of the retardation layer was set to 0.36%.

Comparative Example 1

In Comparative Example 1, on the other hand, a retardation-controlling optical member was formed in the same manner as in Example 1, except that a shape of a columnar structure was formed into a cylinder having a lower bottom surface of 10μφ; 80,000 columnar structures were formed per 100 cm$^2$ on a retardation layer surface; and an occupation area rate of the lower bottom surface of the columnar structures was set to 0.25%

(Evaluation 1)
Loading and Unloading Test 1

A plastic deformation rate (W %) of a retardation-controlling optical member is calculated as described below. First, the retardation-controlling optical member is set on a hardness meter. A thickness of the retardation-controlling optical member after the loading and unloading test 1 by use of an indenter, that is made of diamond and has a tip surface formed into a square planar shape with a side of 100 (μm), is taken as a total thickness (D2). Furthermore, a total thickness (D1) of the retardation-controlling optical member prior to the loading and unloading test 1 and unevenness difference (H) are measured. Then, calculation is made by a formula expressed by (ΔH/H)×100, where ΔH=(D1−D2). A value shown below as a result of the evaluation 1 is an average value obtained by executing the test at different 10 positions and averaging the results. Hereinbelow, Evaluations 2 to 4 are similarly carried out.

In this connection, the total thickness (D1) of the retardation-controlling optical member prior to the loading and unloading test 1 was first measured. Further, a magnitude (H)

of the unevenness difference formed on a surface of the retardation-controlling optical member was measured.

Next, from among columnar structures disposed on the retardation-controlling optical member, adjacent two columnar structures were selected as columnar structures to which a load is applied by the indenter. Then, a tip surface of the indenter was brought into contact with the selected two columnar structures from above an upper bottom of the columnar structures, thereby to apply a load to the retardation-controlling optical member, as will be described below (loading process). In such a loading process, a load applied to the columnar structures of the retardation-controlling optical member due to the indenter was increased to the maximum load at 2 mN/sec. Here, assuming a case where a load of $3\times10^4$ kgf/m$^2$ (36.8 mN) is evenly applied to the columnar structures disposed per 100 cm$^2$ of the retardation-controlling optical member, the maximum load is determined as the load per the number of the columnar structures to which the indenter applies a load. In Example 1, since 160,000 columnar structures are disposed per 100 cm$^2$ of the retardation-controlling optical member, the maximum load applied to two columnar structures subjected to the load by the indenter is 36.8 mN (18.4 mN for one columnar structure). From a point of time when the load applied to the columnar structure reached the maximum load, a state where the maximum load was applied to the columnar structure was maintained for 5 sec. Thereafter, the load applied to the columnar structure was reduced at 2 mN/sec down to 0 mN (unloading process). After the unloading process, the state where the load applied to the columnar structure was 0 was maintained once more for 5 sec.

After the loading and unloading test 1, the total thickness (D2) of the retardation-controlling optical member was measured. Based on thus obtained H and ΔH (ΔH=D1−D2), the plastic deformation rate (W=(ΔH/H)×100) (%) was calculated. Controls such as increase, hold and reduction of the load applied to the retardation-controlling optical member were executed by use of a hardness meter (trade name: Fischer Scope H-100, produced by H. Fischer Inc.). The total thicknesses (D1 and D2) of the retardation-controlling optical member and the magnitude (H) of the unevenness difference were measured by use of an electron microscope (trade name: JCM-5700, produced by JEOL. Ltd.) and a stylus film thickness meter (trade name: Alpha Step, produced by Tencor Corporation).

As to the retardation-controlling optical member of Example 1, H and ΔH, respectively, were 3.5 μm and 0.25 μm and the plastic deformation rate W was 7.1%.

Similarly, the plastic deformation rates of the retardation-controlling optical members of Example 2 and Comparative example 1 were also evaluated. Specifically, the loading and unloading test was carried out in the same manner as in Example 1, except that one columnar structure was selected as a columnar structure on which a load is applied by an indenter; a tip surface of the indenter was brought into contact with the one columnar structure from above the upper bottom of the columnar structure; and a load was applied up to the maximum load of 36.8 mN. The total thicknesses (D1, D2) of the retardation-controlling optical member were measured, and similarly to Example 1, the unevenness difference (H) of the retardation-controlling optical member was measured and the plastic deformation rate (W) was calculated based on the measured values. An indenter similar to that of Example 1 was used as the indenter used when the plastic deformation rate (W) was obtained.

As a result, as to the retardation-controlling optical member of Example 2, H and ΔH, respectively, were 3.5 μm and 0.38 μm and the plastic deformation rate W was 10.9%. On the other hand, as to the retardation-controlling optical member of Comparative example 1, H and ΔH, respectively, were 3.5 μm and 0.73 μm and the plastic deformation rate W was 20.9%. Results of Evaluation 1 of Example 1, Example 2 and Comparative example 1 are shown in Table 1.

The plastic deformation rates W of the columnar structures before and after the test may be understood same as a variation rate of a cell gap when external pressure is applied in liquid crystal displays provided with Example 1, Example 2 and Comparative example 1. As mentioned above, when a cell gap varies (deteriorates) by substantially 15% partially in a display area of a liquid crystal display, the transmittance is deteriorated by substantially 4% and the brightness unevenness becomes a level recognizable to an observer. Accordingly, the results of the above Evaluation 1, in the plastic deformation rates of the columnar structures of Examples 1 and 2, are variation rates of cell gap to an extent where the brightness unevenness is not observed. On the other hand, in Comparative example 1, it is shown that the cell gap varies to a level where visually observable brightness unevenness is generated.

Next, a liquid crystal display having a retardation-controlling optical member incorporated therein was prepared and a display state of a liquid crystal screen when pressing force was applied to a liquid crystal display was observed, thereby to evaluate whether the brightness unevenness is generated or not.

(Preparation of Liquid Crystal Display)

In the beginning, AL1254 (trade name, produced by JSR Corporation) was prepared as an alignment film composition constituting a horizontal alignment film for horizontally aligning driving liquid crystal molecules filled in a liquid crystal display. The alignment film composition was coated by a flexo printing method so as to cover a retardation layer and columnar structures in a retardation-controlling optical member of Example 1 to obtain a coating film. The coating film was baked, followed by rubbing a surface of the coating film by use of a rayon rubbing cloth, whereby the coating film was rendered a horizontal alignment film.

Then, a glass substrate having a pixel electrode (TFT) formed on its surface was prepared, and further a horizontal alignment film was formed on the TFT-formed surface of the glass substrate similarly to the case where the retardation-controlling optical member was disposed.

The retardation-controlling optical member having a horizontal alignment film formed thereon and the glass substrate having a horizontal alignment film and TFT formed thereon were faced with columnar structures interposed therebetween. Then, an epoxy resin as a sealing agent was used to seal a gap between the retardation-controlling optical member and the glass substrate facing thereto at a periphery position of the retardation-controlling optical member and the glass substrate facing thereto. Subsequently, pressure of 0.3 kg/m$^2$ was applied at 150° C. to adhere the retardation-controlling optical member and the glass substrate facing thereto. Then, a driving liquid crystal material (trade name: ZLI4792, produced by Merck Co., Ltd.) for varying the orientation in accordance with a variation of an electric field was filled in a space portion formed between the opposing retardation-controlling optical member and glass substrate to form a driving liquid crystal layer, whereby a structure (liquid crystal cell) was obtained. Subsequently, at outside positions in a thickness direction of the liquid crystal cell, two polarization plates were placed with the liquid crystal cell sandwiched therebetween and with transmission axes disposed in an orthogonal direction, followed by adhering, thereby to obtain a liquid crystal display. The liquid crystal display is provided with a structure where a driving liquid crystal layer is formed between a substrate having the retardation-controlling optical member incorporated therein and a substrate provided with the TFT, so that the substrate having the retardation-controlling optical member incorporated therein works as a display side substrate, and a substrate provided with the TFT works as a driving liquid crystal side substrate.

Furthermore, liquid crystal displays were prepared in the same manner as in Example 2 and Comparative Example 1, except that the retardation-controlling optical members of Example 2 and Comparative example 1 were used.

(Evaluation 2)
Evaluation of Brightness Unevenness

First, the obtained liquid crystal displays were irradiated with light from the outside position of a driving liquid crystal substrate side, and liquid crystal display screens were operated so as to display white, followed by visually observing a state of the liquid crystal display screens.

Next, by using the liquid crystal display, the tip surface of the indenter was pressed against a surface of the display side substrate by making use of an indenter that was a cylinder having a diameter of 2 cm with a flat tip surface, thereby to apply a load on the surface of the display side substrate. The load applied to the surface of the display side substrate was gradually increased up to stress of $3 \times 10^4$ kgf/cm$^2$ (36.8 mN) at the maximum. Thereafter, the load applied to the surface of the display side substrate due to the indenter was removed (unloading). After the unloading, the liquid crystal display was further left at room temperature for 5 sec. Thereafter, a position outside of the driving liquid crystal substrate side of the liquid crystal display was irradiated with light and a white display was made on the liquid crystal screen, followed by visually confirming a state of the liquid crystal display screen.

The states of the liquid crystal display screen before and after the indenter was pressed against the surface of the display side substrate were compared to determine whether, between before and after the indenter was pressed against the surface of the display side substrate, brightness variation of a portion of the liquid crystal display screen against which the indenter was pressed was observed or not. When the observer judged that could not find the brightness variation, the liquid crystal display was evaluated to be excellent as suppressing the brightness unevenness from continuously generating. On the other hand, when the observer judged could find the brightness variation, the brightness unevenness was not sufficiently suppressed from continuously occurring, so that the liquid crystal display was evaluated as a defect.

In the liquid crystal displays that used the retardation-controlling optical members of Examples 1 and 2, the brightness variation was not observed, during a white display, in its portion in contact with the indenter. Accordingly, the liquid crystal displays were evaluated as excellent. On the other hand, in the liquid crystal display that used the retardation-controlling optical member of Comparative example 1, the transmittance of a portion where the pressure was applied was deteriorated, a display in the portion became dark to be able to observe the display unevenness, and accordingly, the liquid crystal display was evaluated as a defect. Results of Evaluation 2 of the liquid crystal displays that uses Examples 1 and 2 and Comparative example 1 are shown in Table 1.

Reference Examples 1 to 3

In Reference Example 1, a retardation-controlling optical member was formed in the same manner as in Example 1, except that a columnar structure was formed with taper such that a ratio of a cross sectional area of the columnar structure cut at a height of 90% from a lower bottom surface of the columnar structure to a lower bottom surface of the columnar structure (hereinafter, simply referred to as well as "90% height cross section ratio") was set to 20%.

Similarly to Reference Example 1, a retardation-controlling optical member was formed as Reference Example 2 in the same manner as in Example 1 except that the 90% height cross section ratio was set to 3%, and a retardation-controlling optical member was formed as Reference Example 3 in the same manner as in Example 1 except that the 90% height cross section ratio was set to 70%.

(Evaluation 3)
Loading and Unloading Test 2

In order to simulatively evaluate the securement of the margin when a retardation-controlling optical member and a counter substrate are adhered to assemble a cell, the loading and unloading test 2 described below was carried out by use of Example 1 and Reference Examples 1 to 3.

A method of the loading and unloading test 2 in Evaluation 3 was carried out similarly to the loading and unloading test 1 in Evaluation 1 except that a loading weight was set to 3.68 mN. However, in Evaluation 3, during an entire process of the loading and unloading test 2, a deformation amount ΔH' at the indenter weight of 3.68 mN (total thickness (D1) of the retardation-controlling optical member before the loading test−total thickness (D3) of the retardation-controlling optical member at the time of loading of 3.68 mN) was first obtained as the loading test. Then, the deformation rate W' after the loading test was obtained from formula (3) below.

$$W' = \Delta H'/H \times 100 \qquad (3)$$

The loading test was conducted with an intention to evaluate, when 3.68 mN was adopted as a value corresponding to pressure applied to both substrates generally when the retardation-controlling optical member and the counter substrate were combined, whatever extent the retardation-controlling optical member was compressed at the time of cell assembling.

Next, the state was maintained for 5 sec, followed by removing the load at a constant speed until the load became 0 mN. Then, after the unloading, a ratio of the 90% height cross section after the loading and unloading test 2 to the 90% height cross section of the columnar structure before the loading and unloading test 2 was obtained. The deformation rates W' at the 3.68 mN and the 90% height cross section ratios after the loading and unloading test 2 of Example 1 and Reference Examples 1 to 3 are shown in Table 2.

(Evaluation 4)
Loading and Unloading Test 3

Subsequently, the loading and unloading test 3 was conducted with Example 1 and Reference Examples 1 to 3 supplied to the loading and unloading test 2. The loading and unloading test 3 was conducted similarly to the method of the loading and unloading test 1. Of the respective samples after the loading and unloading test 3, a total thickness of the retardation-controlling optical member before the loading and unloading test 2 was taken as D1 and a total thickness of the retardation-controlling optical member after the loading and unloading test 3 was taken as D2. As a difference value of the values, a variation amount ΔH of the total thickness of the retardation-controlling optical member was calculated and inserted in the formula (2), thereby to obtain the plastic deformation rate W in the loading and unloading test 3. The obtained plastic deformation rates W are shown in Table 2.

The plastic deformation rate (W' %) at the load of 3.68 mN in Evaluation 3 showed some extent of the deformation rate in all four samples. The deformation rate is understood identical as the margin secured when the retardation-controlling optical member and the counter substrate were assembled in a cell. Reference Examples 1 and 2 showed particularly desirable margin (deformation rate).

All the 90% height cross section ratios of the columnar structures in the respective samples after the loading and unloading test 2 where 3.68 mN was the maximum loading pressure were small values. That is, even in Reference Examples 1 and 2 provided with tapered columnar structures prepared with a slender tip, it was confirmed that the 90% height cross section did not vary so much before and after the loading and unloading test 2.

Furthermore, the plastic deformation rates (W %) in Evaluation 4 evaluated after the loading and unloading test 3 were 15% or less in all samples. That is, it was confirmed that the brightness unevenness was not continuously recognized by the observer in liquid crystal displays prepared with the retardation-controlling optical members. Reference Examples 1 and 2 that showed excellent plastic deformation rate in the loading test of the loading and unloading test 2 did not show the plastic deformation rate problematic in the brightness unevenness in the loading and unloading test 3 executed after the loading test. From these results, it was confirmed that, in the tapered columnar structure prepared slenderly in the upper portion of the columnar structure, collapse was mainly generated with the slender portion to an extent that secured excellent margin in the step of adhering two substrates. Then, it was indicated that, after the slender portion was compressed due to the collapse (that is, after assembled as a liquid crystal cell), even a tapered columnar structure prepared slender at the upper portion did not collapse to an extent that was problematic in the brightness unevenness, with respect to external pressure applied in a thickness direction of the liquid crystal cell, due to the relative relationship with the retardation layer very softer than the columnar structure.

TABLE 1

|  | Evaluation 1 (Loading and Unloading Test 1) Plastic Deformation Rate W (%) | Evaluation 2 Evaluation of Brightness unevenness |
| --- | --- | --- |
| Example 1 | 7.1 | Excellent |
| Example 2 | 10.9 | Excellent |
| Comparative Example 1 | 20.9 | Poor |

TABLE 2

|  | Column Height (μm) | 90% Height Cross Section Area ratio (%) | Evaluation 3 (Loading and Unloading Test 2) Deformation Rate W' (%) | 90% Height Cross Section Area ratio (%) | Evaluation 4 (Loading and Unloading Test 3) Plastic Deformation Rate W (%) |
| --- | --- | --- | --- | --- | --- |
| Example 1 | 3.5 | 100 | 5.4 | 100.3 | 7.1 |
| Reference Example 1 | 3.5 | 20 | 7.0 | 20.8 | 10.5 |
| Reference Example 2 | 3.5 | 3 | 9.0 | 3.1 | 15.0 |
| Reference Example 3 | 3.5 | 70 | 5.8 | 70.2 | 8.0 |

The invention claimed is:

1. A retardation-controlling optical member comprising: a substrate; a retardation layer formed directly or indirectly on the substrate by polymerizing crosslinkable liquid crystal molecules with orientation imparted thereto and including an effective display region; and a plurality of cell gap-controlling columnar structures formed on the retardation layer, wherein, among the plurality of cell gap-controlling columnar structures in contact with the retardation layer, a sum total of lower surface areas of the cell gap-controlling columnar structures disposed particularly in the effective display region is 0.3% or more of an area of the effective display region.

2. The retardation-controlling optical member according to claim 1, wherein the columnar structure is formed with taper and, of upper and lower surfaces of the tapered columnar structure, a surface larger in area is taken as the lower surface that comes into contact with the retardation layer.

3. The retardation-controlling optical member according to claim 2, wherein, when a surface where the tapered columnar structures come into contact with the retardation layer is taken as the lower surface of the columnar structures and, when a height of the columnar structure measured from the lower surface to the upper surface is set at 100%, a sectional area of the columnar structure cut at a height of 90% from the lower surface is 3% or more and 30% or less of the area of the lower surface.

4. The retardation-controlling optical member according to claim 3, wherein at least two colors of different transparent colored regions are formed between the substrate and the retardation layer.

5. The retardation-controlling optical member according to claim 4, wherein a light shielding region that partitions the transparent colored region is disposed between the substrate and the retardation layer, and the columnar structure is formed above the light shielding region.

6. A liquid crystal display comprising the retardation-controlling optical member according to claim 5.

7. The retardation-controlling optical member according to claim 3, wherein the retardation layer is patterned for each pixel.

8. A liquid crystal display comprising the retardation-controlling optical member according to claim 3.

9. The retardation-controlling optical member according to claim 2, wherein at least two colors of different transparent colored regions are formed between the substrate and the retardation layer.

10. The retardation-controlling optical member according to claim 9, wherein a light shielding region that partitions the transparent colored region is disposed between the substrate and the retardation layer, and the columnar structure is formed above the light shielding region.

11. The retardation-controlling optical member according to claim 2, wherein the retardation layer is patterned for each pixel.

12. A liquid crystal display comprising the retardation-controlling optical member according to claim 2.

13. The retardation-controlling optical member according to claim 1, wherein at least two colors of different transparent colored regions are formed between the substrate and the retardation layer.

14. The retardation-controlling optical member according to claim 13, wherein a light shielding region that partitions the transparent colored region is disposed between the substrate and the retardation layer, and the columnar structure is formed above the light shielding region.

15. The retardation-controlling optical member according to claim 14, wherein the retardation layer is patterned for each pixel.

16. A liquid crystal display comprising the retardation-controlling optical member according to claim 14.

17. The retardation-controlling optical member according to claim 13, wherein the retardation layer is patterned for each pixel.

18. A liquid crystal display comprising the retardation-controlling optical member according to claim 13.

19. The retardation-controlling optical member according to claim 1, wherein the retardation layer is patterned for each pixel.

20. A liquid crystal display comprising the retardation-controlling optical member according to claim 1.

21. The retardation-controlling optical member according to claim 1, wherein the sum total of lower surface areas of the cell gap-controlling columnar structures disposed particularly in the effective display region is 7% or less of the area of the effective display region.

22. The retardation-controlling optical member according to claim 1, wherein constituent components of the columnar structure are in the range of 2H to 5H by pencil hardness.

23. The retardation-controlling optical member according to claim 1, wherein the sum total of lower surface areas of the cell gap-controlling columnar structures disposed particularly in the effective display region is 7% or less of the area of the effective display region, and constituent components of the columnar structure are in the range of 2H to 5H by pencil hardness.

24. The retardation-controlling optical member according to claim 1, wherein a columnar structure is cylindrical columnar so that an area of an upper surface is equal to an area of a lower surface or is taper so that an area of an upper surface is smaller than an area of a lower surface.

25. The retardation-controlling optical member according to claim 1, wherein a columnar structure is prevented from subsiding in the retardation layer even when external pressure is applied in a thickness direction of the substrate.

26. The retardation-controlling optical member according to claim 1, wherein a columnar structure operates to disperse a load transmitted between a lower surface of the columnar structure and a retardation layer surface even when a user applies external pressure in a thickness direction of the substrate.

27. The retardation-controlling optical member according to claim 1, wherein a columnar structure brings an operation that a visually observable brightness unevenness due to a variation of a thickness direction of the substrate is preferably inhibited from occurring.

\* \* \* \* \*